United States Patent
Iwakawa

(10) Patent No.: US 11,797,324 B2
(45) Date of Patent: Oct. 24, 2023

(54) STATUS DISPLAY METHOD AND STORAGE MEDIUM

(71) Applicant: FUJITSU LIMITED, Kawasaki (JP)

(72) Inventor: Akinori Iwakawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 347 days.

(21) Appl. No.: 17/166,606

(22) Filed: Feb. 3, 2021

(65) Prior Publication Data

US 2021/0294627 A1    Sep. 23, 2021

(30) Foreign Application Priority Data

Mar. 23, 2020 (JP) ................................ 2020-051218

(51) Int. Cl.
*G06F 9/455* (2018.01)
*G06F 9/48* (2006.01)

(52) U.S. Cl.
CPC ........ *G06F 9/45533* (2013.01); *G06F 9/4856* (2013.01)

(58) Field of Classification Search
CPC .................................................. G06F 9/45533
USPC .......................................................... 718/1
See application file for complete search history.

(56) References Cited

U.S. PATENT DOCUMENTS

| | | | | |
|---|---|---|---|---|
| 10,936,717 B1* | 3/2021 | Herman Saffar | ... | G06F 9/45558 |
| 11,055,273 B1* | 7/2021 | Meduri | ............... | G06F 16/2358 |
| 2016/0203030 A1 | 7/2016 | Tateishi et al. | | |
| 2017/0199770 A1* | 7/2017 | Peteva | ................... | G06F 9/5088 |
| 2017/0371717 A1 | 12/2017 | Kiess et al. | | |
| 2018/0005114 A1* | 1/2018 | Tomita | ..................... | G06N 3/04 |
| 2018/0109464 A1* | 4/2018 | Chen | ................... | G06F 11/3442 |
| 2018/0121242 A1* | 5/2018 | Zhang | ................... | G06F 9/5011 |
| 2018/0145883 A1 | 5/2018 | Kaneko et al. | | |
| 2018/0285166 A1* | 10/2018 | Roy | ..................... | G06F 11/3006 |
| 2018/0349168 A1* | 12/2018 | Ahmed | ............... | G06F 11/3006 |

(Continued)

FOREIGN PATENT DOCUMENTS

| | | |
|---|---|---|
| EP | 3522013 A1 | 8/2019 |
| JP | 2016-126677 A | 7/2016 |

(Continued)

OTHER PUBLICATIONS

Extended European Search Report dated Jun. 24, 2021, for corresponding to European Patent Application No. 21153714.7, 8 pages.

*Primary Examiner* — Mehran Kamran
(74) *Attorney, Agent, or Firm* — Fujitsu Patent Center

(57) ABSTRACT

A status display method performed by a computer, includes receiving first information indicating a usage status of a processor in a predetermined time zone of the plurality of containers which operates on a virtual machine (VM); receiving second information indicating the usage status of the processor in the predetermined time zone of a first communication process of the VM; identifying, for the plurality of containers, by using the first information and the second information, third information indicating the usage status of the processor in the predetermined time zone of a second communication process of the VM related to communication performed by each of the plurality of containers; and displaying, for the plurality of containers, a result in which the first information and the third information are associated with each other.

8 Claims, 28 Drawing Sheets

(56) References Cited

U.S. PATENT DOCUMENTS

| | | | | |
|---|---|---|---|---|
| 2019/0026142 A1* | 1/2019 | Kato | ................... | G06F 11/3006 |
| 2019/0286077 A1* | 9/2019 | Koyama | .............. | G05B 13/042 |
| 2019/0317829 A1* | 10/2019 | Brown | .................. | G06F 9/5077 |
| 2019/0391897 A1* | 12/2019 | Vijendra | ................ | G06N 20/00 |
| 2020/0104737 A1* | 4/2020 | Abaci | ................... | G06N 20/00 |
| 2020/0225990 A1* | 7/2020 | Vaddi | ...................... | G06F 9/455 |
| 2020/0267071 A1* | 8/2020 | Ghag | ..................... | G06F 11/301 |
| 2020/0326819 A1* | 10/2020 | Martin | .................... | H04L 41/22 |
| 2021/0109778 A1* | 4/2021 | Keating | ................ | G06F 9/4856 |
| 2021/0191751 A1* | 6/2021 | Park | ..................... | G06F 9/5011 |
| 2021/0288882 A1* | 9/2021 | Bhatnagar | ........... | G06F 11/3006 |
| 2021/0294627 A1* | 9/2021 | Iwakawa | .............. | G06F 9/5088 |
| 2022/0100548 A1* | 3/2022 | Ito | .......................... | G06N 20/00 |

FOREIGN PATENT DOCUMENTS

| | | |
|---|---|---|
| JP | 2018-503897 A | 2/2018 |
| JP | 2018-084986 A | 5/2018 |

\* cited by examiner

FIG. 2

| CONTAINER ID | NETWORK BANDWIDTH FOR USE (GB/Sec) | CPU USAGE RATE (%) |
|---|---|---|
| 1 | 2 | 20 |
| 2 | 1 | 40 |

FIG. 15

| CONTAINER ID | EXECUTION MODULE ID |
|---|---|
| C001 | M001,M002 |
| C002 | M003,M004 |
| C003 | M005 |

FIG. 16

| TIME | MODULE 33a (%) | MODULE 34a (%) | MODULE 35a (%) |
|---|---|---|---|
| 10:00:00 | 66 | 59 | 11 |
| 10:00:10 | 65 | 30 | 17 |
| 10:00:20 | 50 | 83 | 40 |
| 10:00:30 | 46 | 65 | 33 |

FIG. 17

| TIME | COMMUNICATION PROCESS (%) |
|---|---|
| 10:00:00 | 36 |
| 10:00:10 | 26 |
| 10:00:20 | 58 |
| 10:00:30 | 37 |

FIG. 19

| VMID | CONTAINER 33a | | CONTAINER 34a | | CONTAINER 35a | |
|---|---|---|---|---|---|---|
| | CONTAINER (%) | COMMUNICATION (%) | CONTAINER (%) | COMMUNICATION (%) | CONTAINER (%) | COMMUNICATION (%) |
| VM31 | 30 | 3.0 | 20 | 9.0 | - | - |
| VM32 | - | - | - | - | 10 | 2.8 |

FIG. 20

| VMID | CONTAINER ID |
|------|--------------|
| V001 | C001 |
| V001 | C002 |
| V002 | C003 |

FIG. 21

| MOVEMENT-SOURCE THRESHOLD (%) | MOVEMENT-DESTINATION THRESHOLD (%) |
|---|---|
| 30 | 50 |

FIG. 24

| TIME | MODULE 33a (%) | MODULE 34a (%) | MODULE 35a (%) |
|---|---|---|---|
| 10:00:00 | 66 | 59 | 11 |
| 10:00:10 | 65 | 30 | 17 |
| 10:00:20 | 50 | 83 | 40 |
| 10:00:30 | 46 | 65 | 33 |

FIG. 25

| TIME | FIRST COMMUNICATION PROCESS (%) | SEOND COMMUNICATION PROCESS (%) |
|---|---|---|
| 10:00:00 | 36 | 50 |
| 10:00:10 | 26 | 37 |
| 10:00:20 | 58 | 63 |
| 10:00:30 | 37 | 54 |

FIG. 26

| VMID | CONTAINER 33 | | CONTAINER 34 | | CONTAINER 35 | |
|---|---|---|---|---|---|---|
| | CONTAINER (%) | COMMUNICATION (%) | CONTAINER (%) | COMMUNICATION (%) | CONTAINER (%) | COMMUNICATION (%) |
| VM31 | 30 | 11.4 | 20 | 18.6 | - | - |
| VM32 | - | - | - | - | 10 | 5.3 |

FIG. 28

| UPPER LIMIT THRESHOLD (%) |
|---|
| 70 |

STATUS DISPLAY METHOD AND STORAGE MEDIUM

CROSS-REFERENCE TO RELATED APPLICATION

This application is based upon and claims the benefit of priority of the prior Japanese Patent Application No. 2020-51218, filed on Mar. 23, 2020, the entire contents of which are incorporated herein by reference.

FIELD

The embodiments discussed herein are related to a status display method and a storage medium.

BACKGROUND

In recent years, social infrastructure for network services such as ticket booking systems and communication systems has been developed, and there is a demand for operations such as troubleshooting without stopping the operation of enterprise systems.

Therefore, in recent years, there is progress in the application of a container virtualization technology that simplifies recovery from failures and distributes the processing load by packaging, on a unit basis called container, modules for execution in order to provide services and combining such containers. Japanese Laid-Open Patent Publication No. 2016-126677 is disclosed as a related art, for example.

SUMMARY

According to an aspect of the embodiments, a status display method performed by a computer, includes receiving first information indicating a usage status of a processor in a predetermined time zone of the plurality of containers which operates on a virtual machine (VM); receiving second information indicating the usage status of the processor in the predetermined time zone of a first communication process of the VM; identifying, for the plurality of containers, by using the first information and the second information, third information indicating the usage status of the processor in the predetermined time zone of a second communication process of the VM related to communication performed by each of the plurality of containers; and displaying, for the plurality of containers, a result in which the first information and the third information are associated with each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an explanatory table illustrating a specific example of the load status of each container;

FIG. 15 is an explanatory table illustrating a specific example of module management information 234;

FIG. 16 is an explanatory table illustrating a specific example of first usage-rate information 231;

FIG. 17 is an explanatory table illustrating a specific example of second usage-rate information 232;

FIG. 19 is an explanatory table illustrating a specific example of result information 131;

FIG. 20 is an explanatory table illustrating a specific example of container management information 235;

FIG. 21 is an explanatory table illustrating a specific example of threshold information 133;

FIG. 24 is an explanatory table illustrating a specific example of first usage-rate information 231;

FIG. 25 is an explanatory table illustrating a specific example of second usage-rate information 232;

FIG. 26 is an explanatory table illustrating a specific example of result information 131;

FIG. 28 is an explanatory table illustrating a specific example of communication restraint information 134.

DESCRIPTION OF EMBODIMENTS

Here, the administrator of an enterprise system (hereinafter, also simply referred to as an administrator) evaluates the throughput of the enterprise system at a desired timing and confirms the communication performance of the services provided to the user, for example.

However, in an enterprise system to which such a container virtualization technology as above is applied, in a case where communication is performed within the same host (physical host), the communication packet is sent to a virtual switch without passing via the communication hardware of the host, and processed by the virtual switch serving as software that operates within the host. As a result, for example, even if the central processing unit (CPU) usage rate measured for each container is not so large, there may arise a case that frequent performance of communication processing within the same host results in an increase in the load on the entire host. Thus, there is a case where the administrator may fail to accurately specify a container that is loading the host.

In view of the above, it is desirable to enable specifying such a container that is affecting the host.

[Configuration of Information Processing System]

Figure 1:
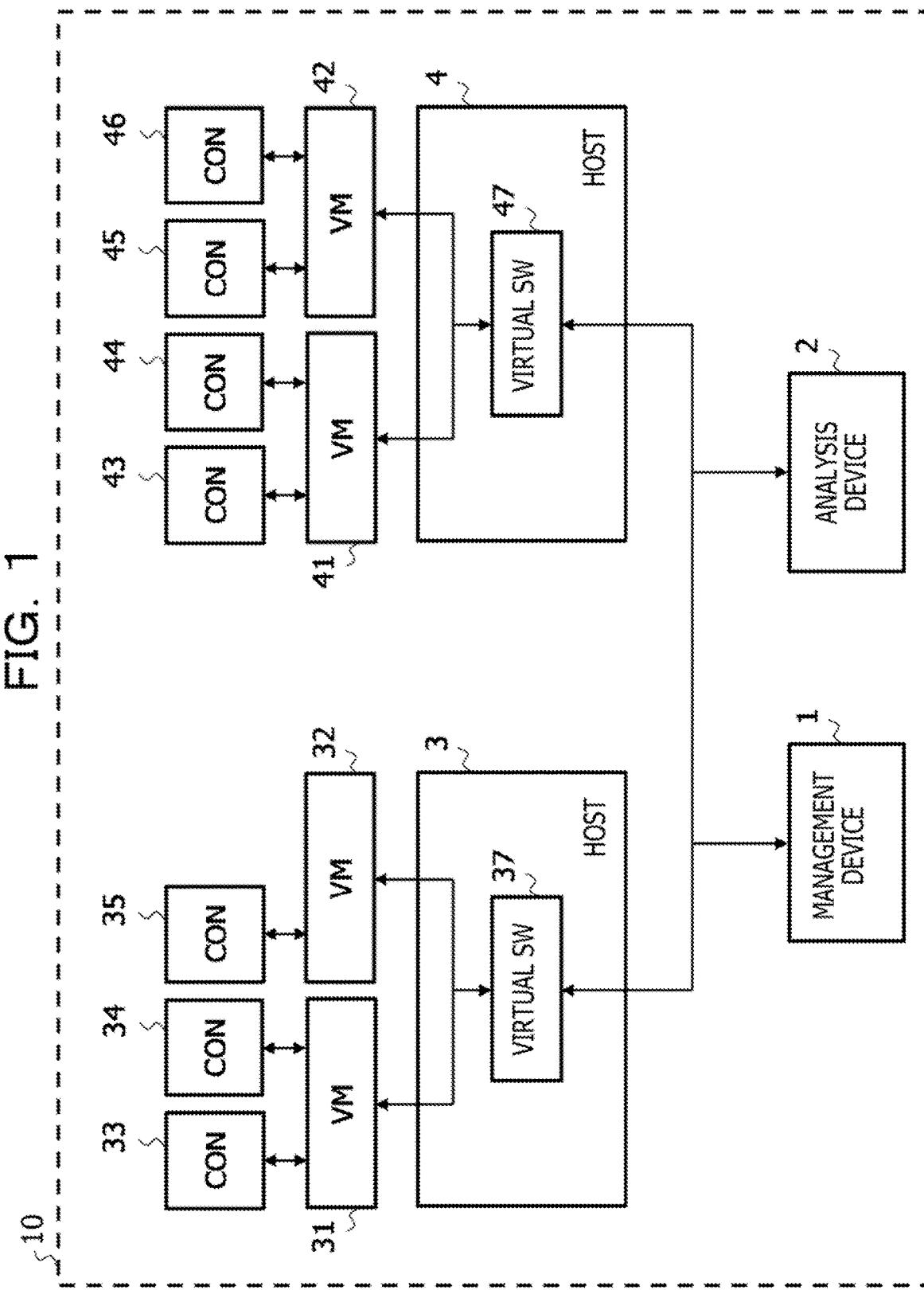
FIG. 1 is an explanatory diagram illustrating the configuration of an information processing system 10.

First, the configuration of an information processing system 10 will be described. FIG. 1 is an explanatory diagram illustrating the configuration of the information processing system 10.

The information processing system 10 illustrated in FIG. 1 includes a management device 1, an analysis device 2, and a host 3 and a host 4 serving as physical machines. Note that there will be described below a case where the information processing system 10 includes two hosts (host 3 and host 4); the information processing system 10, however, may include the number of hosts other than two.

In the example illustrated in FIG. 1, a virtual machine (VM) 31, a virtual machine 32, and a virtual switch 37 are each in operation on the host 3. For example, hypervisor (not illustrated) that operates on the host 3 allocates physical resources of the host 3 to each of the virtual machine 31, the virtual machine 32, and the virtual switch 37, and causes each of the virtual machine 31, the virtual machine 32, and the virtual switch 37 to operate.

On the other hand, a virtual machine 41, a virtual machine 42, and a virtual switch 47 are each in operation on the host 4. For example, hypervisor (not illustrated) that operates on the host 4 allocates physical resources of the host 4 to each of the virtual machine 41, the virtual machine 42, and the virtual switch 47, and causes each of the virtual machine 41, the virtual machine 42, and the virtual switch 47 to operate.

Then, in the example illustrated in FIG. 1, each of a container 33 and a container 34 is a combination of modules for execution in order to provide a service to the user. The container 33 and the container 34 operate on the virtual machine 31. Similarly, a container 35 operates on the virtual machine 32. A container 43 and a container 44 operate on the virtual machine 41. Furthermore, a container 45 and a container 46 operate on the virtual machine 42.

The analysis device 2 analyzes the load status of each container at a periodic timing, for example.

The management device 1 manages each container that operates on the host 3 and the host 4. For example, the management device 1 moves, for example, each container to another host on the basis of the result of the analysis performed by the analysis device 2.

Note that there will be described below a case where two virtual machines operate on each host; however, each host may operate the number of virtual machines other than two. In addition, there will be described below a case where one or two containers operate on each virtual machine; however, each virtual machine may operate three or more containers.

[Specific Example of Processing in Analysis Device]

Next, a specific example of the processing in the analysis device 2 will be described. FIG. 2 is an explanatory table illustrating a specific example of the load status of each container.

The information indicated in FIG. 2 is, for example, periodically acquired by the analysis device 2. Such information has items "container ID", "network bandwidth for use", and "CPU usage rate". The "container ID" is identification information for each container. The bandwidth of a network (physical network via which the host 3 and host 4 are connected) to be used by each container is set to the "network bandwidth for use". The present (latest) CPU usage rate of each container is set to the "CPU usage rate".

For example, in the information indicated in FIG. 2, "1" as the "container ID", "2 (GB/Sec)" as the "network bandwidth for use", and 20(%)" as the "CPU usage rate" are set to the information in the first row.

Furthermore, in the information indicated in FIG. 2, "2" as the "container ID", "1 (GB/Sec)" as the "network bandwidth for use", and "40(%)" as the "CPU usage rate" are set to the information in the second row.

Then, the analysis device 2 refers to the information set to the "CPU usage rate" of the information indicated in FIG. 2, and analyzes the load information of each container, for example.

For example, in the Information indicated in FIG. 2, "20(%)" is set to the "CPU usage rate" of the information including the "container ID" of "1", and "40(%)" is set to the "CPU usage rate" of the information including the "container ID" of "2". Thus, in this case, the analysis device 2 determines, for example, that the container with the "container ID" of "2" is in a higher load status than the container with the "container ID" of "1".

However, in the information processing system 10 to which such a container virtualization technology as described above is applied, for example, in a case where communication is performed inside the host 3, the communication packet is sent to the virtual switch 37 without passing via the communication hardware of the host 3 (e.g., a communication memory buffer built in a network adapter), and processed by the virtual switch 37 serving as software that operates within the host 3. Thus, for example, even if the CPU usage rate measured for each container that operates on the host 3 is not so large, there may arise a case that frequent performance of communication processing within the host 3 results in an increase in the load on the entire host 3. Thus, there is a case where the administrator may fail to accurately specify a container that is loading the host 3.

Therefore, the analysis device 2 in the present embodiment, for example, acquires pieces of information corresponding one-to-one to a plurality of containers (container 33, container 34, and container 35) that operate on the virtual machine 31 and the virtual machine 32, the pieces of information each indicating the CPU usage status in the predetermined time zone of the container (hereinafter, also referred to as first information). Furthermore, the analysis device 2 acquires, for example, information indicating the CPU usage status in the predetermined time zone of the communication process (virtual switch 37) of each of the virtual machine 31 and the virtual machine 32 (hereinafter, also referred to as second information).

Then, on the basis of each piece of the first information and the second information, the analysis device 2 calculates information indicating the CPU usage status in the predetermined time zone of the communication process associated with the communication performed by each container, for a plurality of containers that operate on the virtual machine 31 and the virtual machine 32 (hereinafter, also referred to as third information).

Thereafter, the analysis device 2 causes a display device (not illustrated) to display the first information and the third information in association with each other, for the plurality of containers that operate on the virtual machine 31 and the virtual machine 32, for example.

In other words, for example, in the example described with reference to FIG. 1, the load associated with the communication via the virtual switch 37 is the total value of the load due to the communication performed by each container that operates on the host 3. In addition, for example, the load due to the communication via the virtual switch 37 can be replaced with the CPU load associated with the operation of the virtual switch 37.

Thus, the analysis device 2 acquires the second information indicating the CPU load associated with the operation of the virtual switch 37. Then, with the first information indicating the CPU load associated with the operation of each container in addition to the acquired second information, the analysis device 2 calculates the third information indicating the CPU load caused by the communication performed by each container, and displays the calculated third information.

This enables the analysis device 2 to display, for example, the CPU load measured from each container (first information) and the CPU load due to the communication performed by each container (third information) in association with each other. Thus, for example, the administrator browses the contents displayed by the analysis device 2, so that the administrator can accurately specify a container in a high load status (container that has a great influence on the host).

[Hardware Configuration of Information Processing System]

Figure 3:
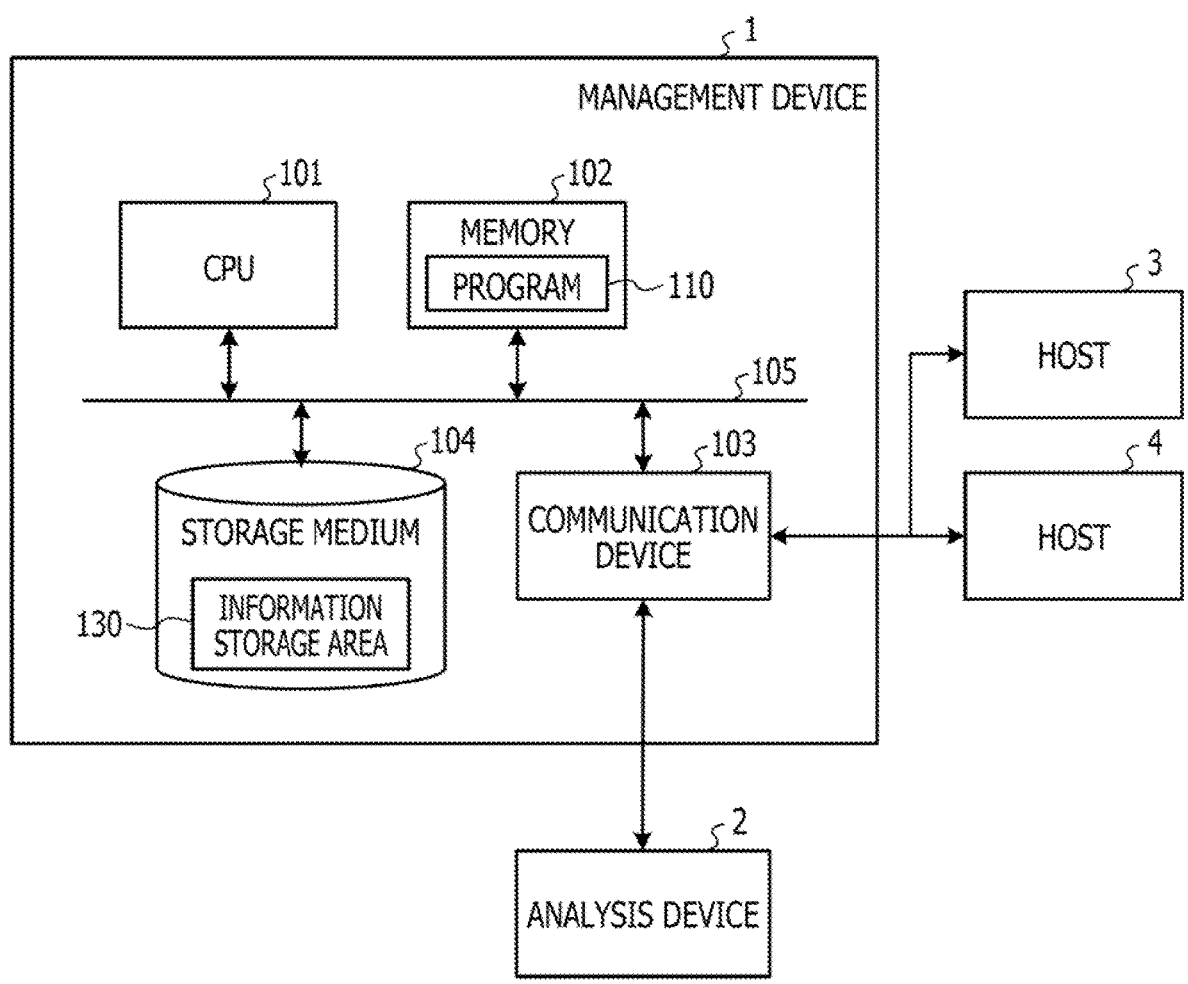
FIG. 3 is an explanatory diagram illustrating the hardware configuration of a management device 1.
Figure 4:
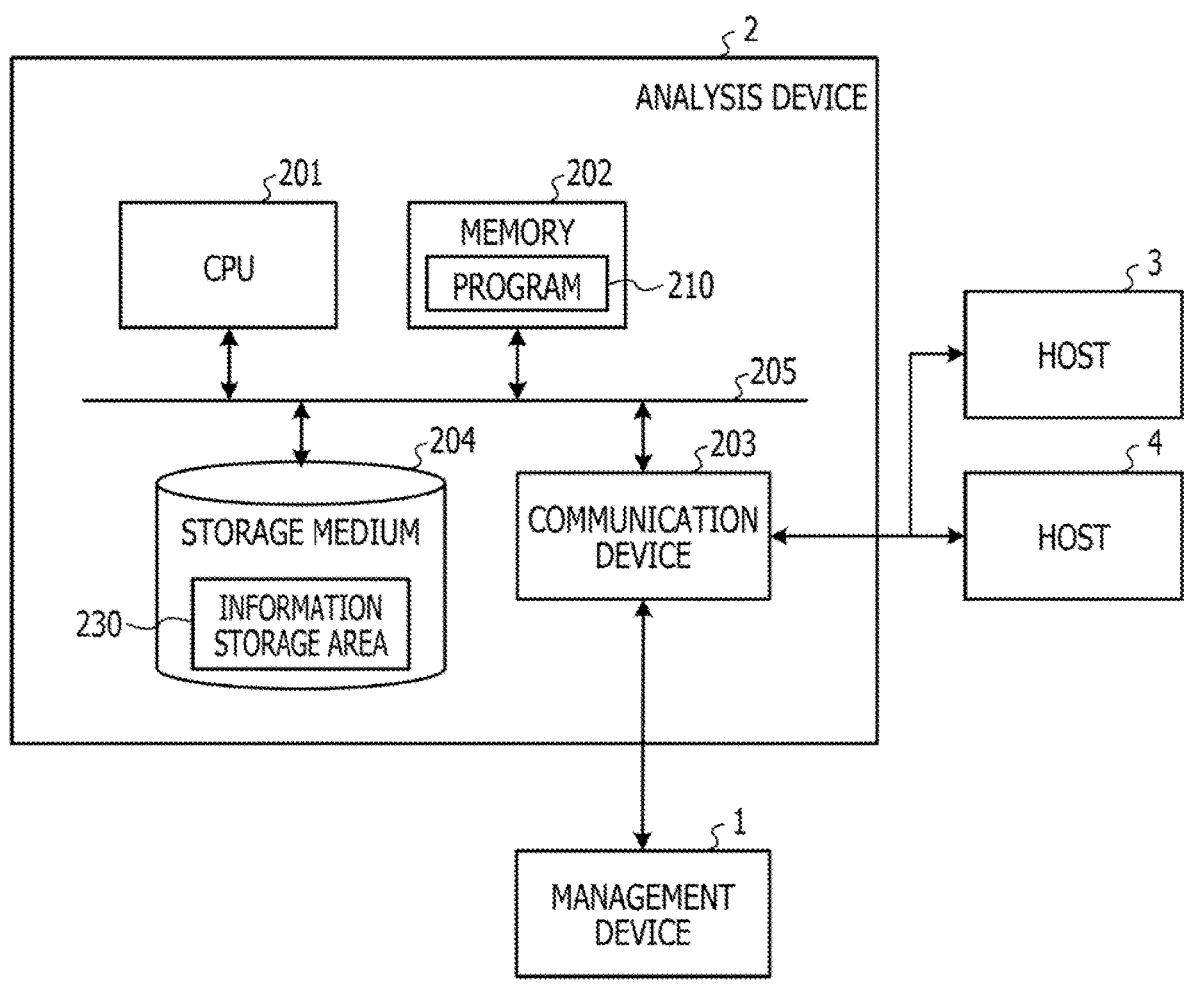
FIG. 4 is an explanatory diagram illustrating the hardware configuration of an analysis device 2.
Figure 5:
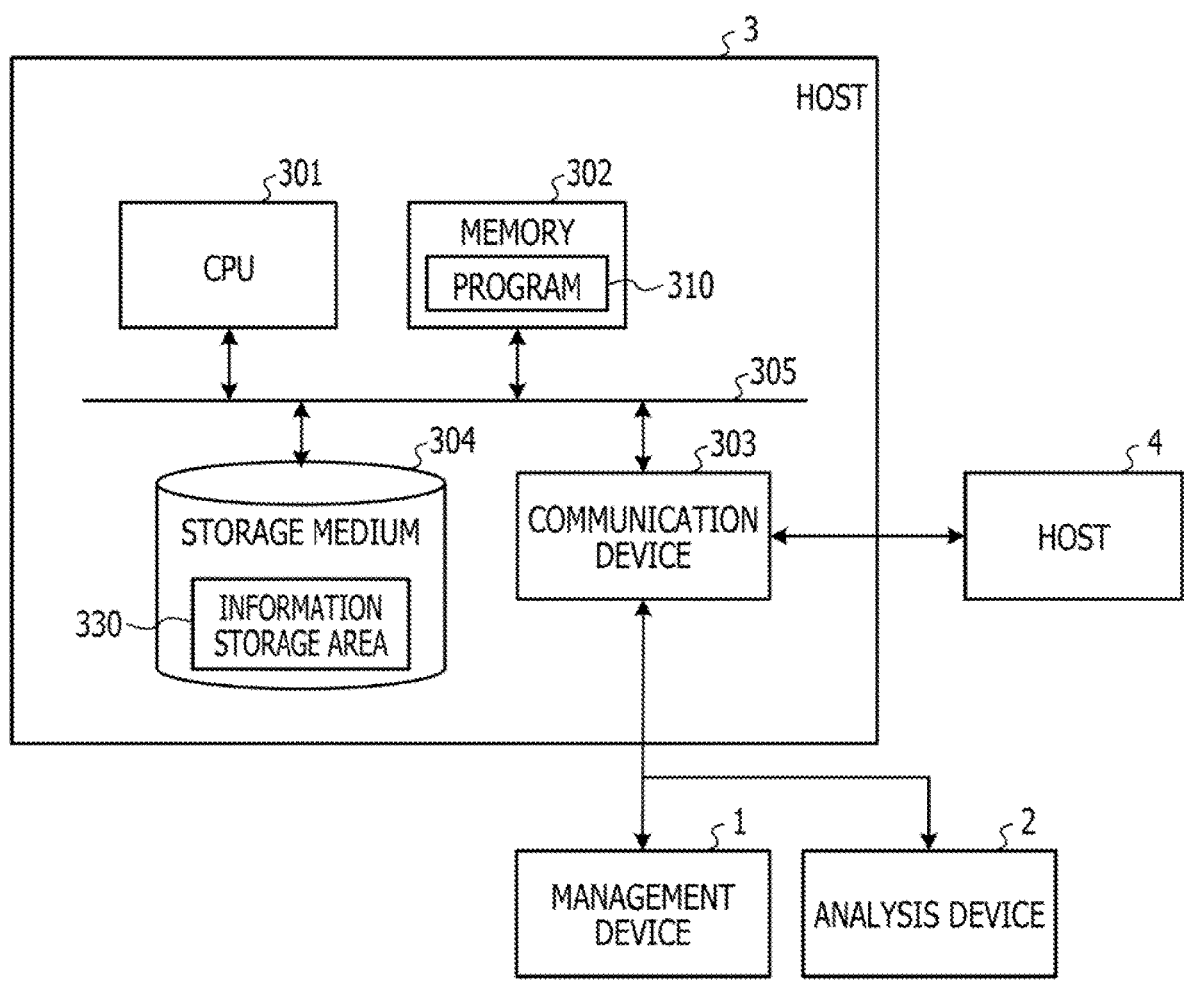
FIG. 5 is an explanatory diagram illustrating the hardware configuration of a host 3.
Figure 6:
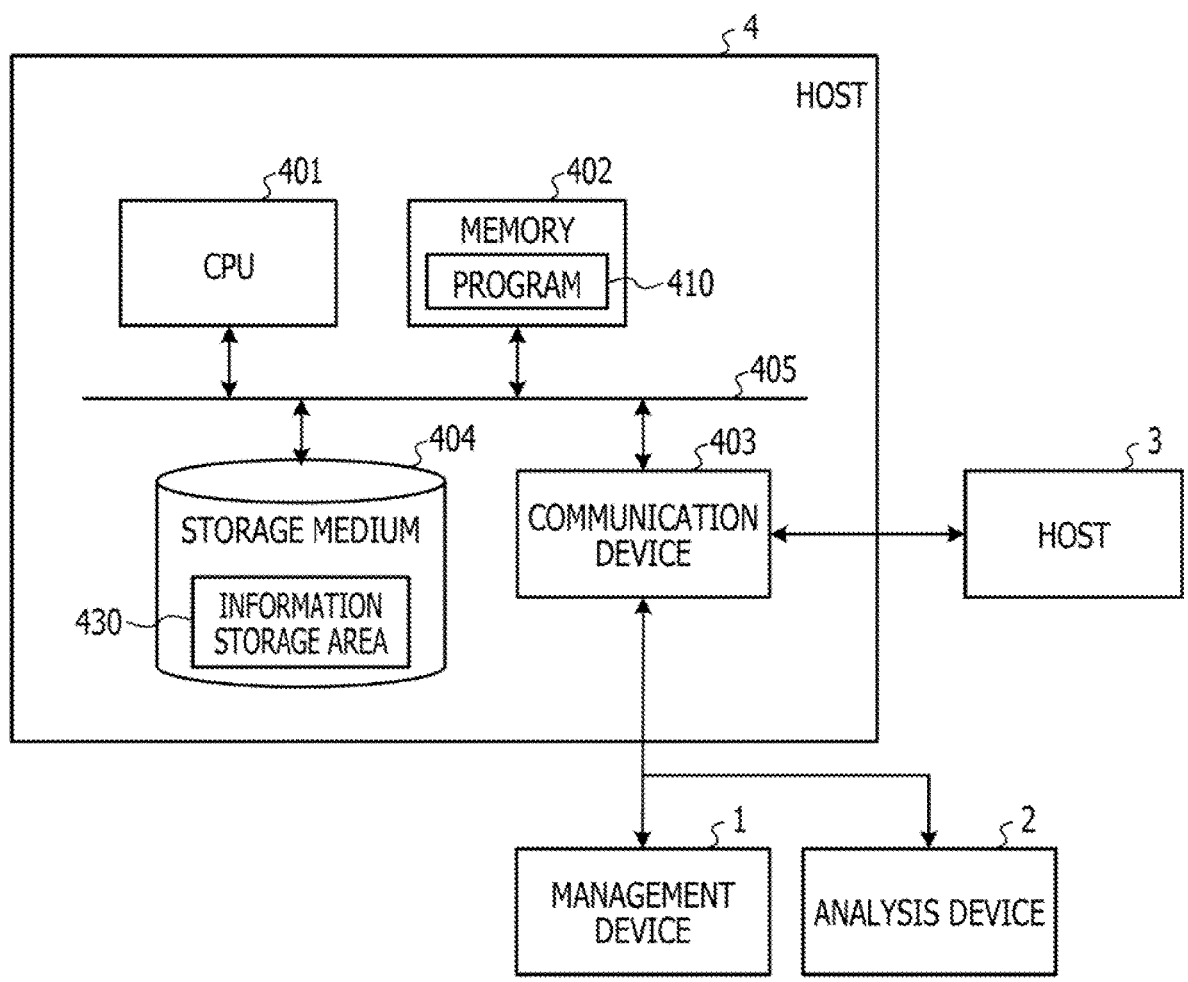
FIG. 6 is an explanatory diagram illustrating the hardware configuration of a host 4.

Next, the hardware configuration of the information processing system 10 will be described. FIG. 3 is an explanatory diagram illustrating the hardware configuration of the management device 1. In addition, FIG. 4 is an explanatory diagram illustrating the hardware configuration of the analysis device 2. Furthermore, FIG. 5 is an explanatory diagram illustrating the hardware configuration of the host 3. Still furthermore, FIG. 6 is an explanatory diagram illustrating the hardware configuration of the host 4.

First, the hardware configuration of the management device 1 will be described.

As illustrated in FIG. 3, the management device 1 includes a central processing unit (CPU) 101 that serves as a processor, a memory 102, a communication device 103, and a storage medium 104. The constituents are connected mutually via a bus 105.

The storage medium 104 has, for example, a program storage area (not illustrated) storing a program 110 for performing processing of displaying the CPU usage status (hereinafter, CPU-status display processing). Furthermore, the storage medium 104 has, for example, an information storage area 130 storing information to be used in performance of the CPU-status display processing. Note that the storage medium 104 may be, for example, a hard disk drive (HDD) or a solid state drive (SSD).

The CPU 101 executes the program 110 loaded from the storage medium 104 into the memory 102 to perform the CPU-status display processing.

In addition, the communication device 103 communicates with the analysis device 2, the host 3, and the host 4 via a network, for example.

Next, the hardware configuration of the analysis device 2 will be described.

As illustrated in FIG. 4, the analysis device 2 includes a CPU 201 that serves as a processor, a memory 202, a communication device 203, and a storage medium 204. The constituents are connected mutually via a bus 205.

The storage medium 204 has, for example, a program storage area (not illustrated) storing a program 210 for performing the CPU-status display processing. Furthermore, the storage medium 204 has, for example, an information storage area 230 for storing information to be used in performance of the CPU-status display processing. Note that the storage medium 204 may be, for example, an HDD or an SSD.

The CPU 201 executes the program 210 loaded from the storage medium 204 into the memory 202 to perform the CPU-status display processing.

In addition, the communication device 203 communicates with the management device 1, the host 3, and the host 4 via the network, for example.

Next, the hardware configuration of the host 3 will be described.

As illustrated in FIG. 5, the host 3 includes a CPU 301 that serves as a processor, a memory 302, a communication device 303, and a storage medium 304. The constituents are connected mutually via a bus 305.

The storage medium 304 has, for example, a program storage area (not illustrated) storing a program 310 for performing the CPU-status display processing. Furthermore, the storage medium 304 has, for example, an information storage area 330 for storing information to be used in performance of the CPU-status display processing. Note that the storage medium 304 may be, for example, an HDD or an SSD.

The CPU 301 executes the program 310 loaded from the storage medium 304 into the memory 302 to perform the CPU-status display processing.

In addition, the communication device 303 communicates with the management device 1, the analysis device 2, and the host 4 via the network, for example.

Next, the hardware configuration of the host 4 will be described.

As illustrated in FIG. 6, the host 4 includes a CPU 401 that serves as a processor, a memory 402, a communication device 403, and a storage medium 404. The constituents are connected mutually via a bus 405.

The storage medium 404 has, for example, a program storage area (not illustrated) storing a program 410 for performing the CPU-status display processing. Furthermore, the storage medium 404 has, for example, an information storage area 430 for storing information to be used in performance of the CPU-status display processing. Note that the storage medium 404 may be, for example, an HDD or an SSD.

The CPU 401 executes the program 410 loaded from the storage medium 404 into the memory 402 to perform the CPU-status display processing.

In addition, the communication device 403 communicates with the management device 1, the analysis device 2, and the host 3 via the network, for example.

[Functions of Information Processing System]

Figure 7:
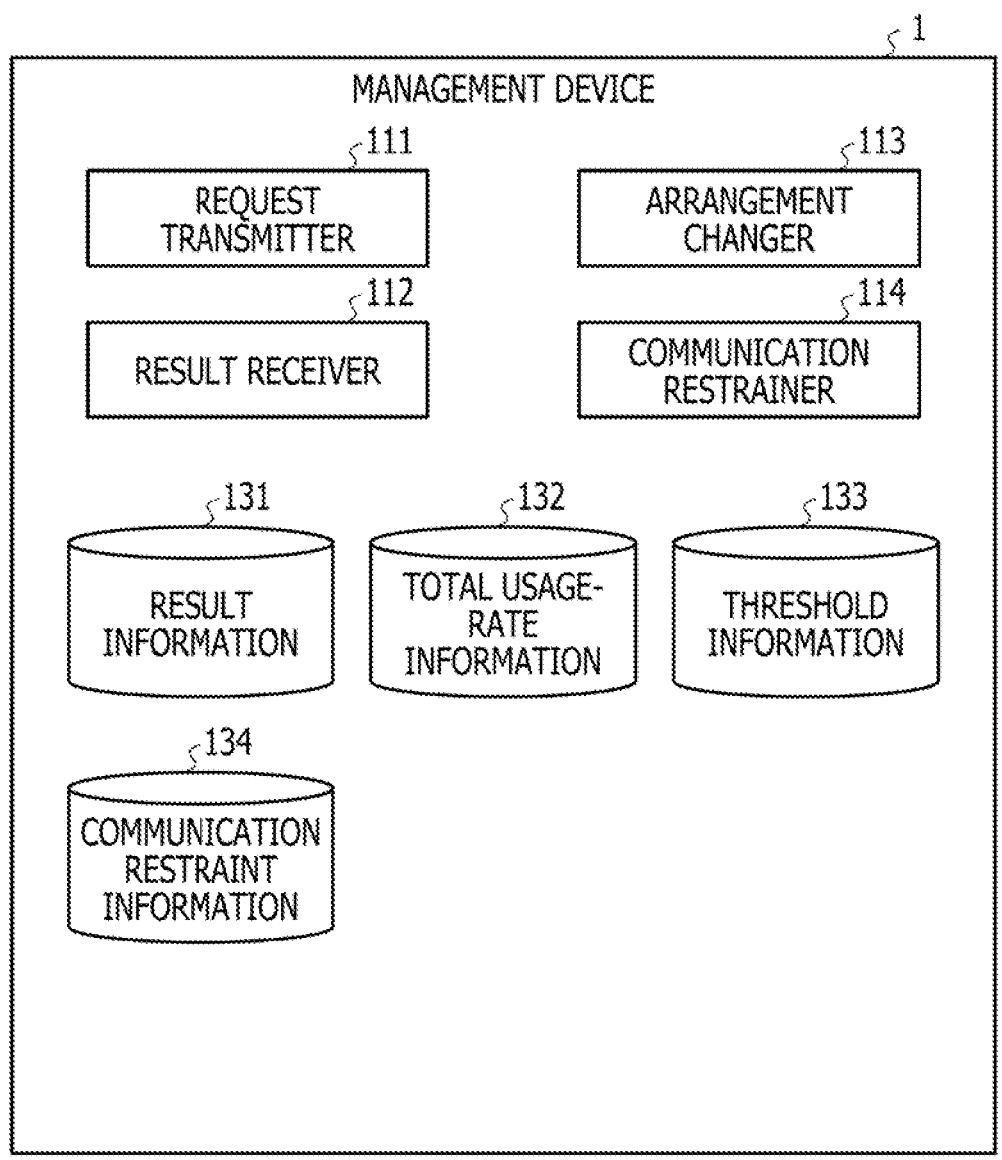
FIG. 7 is a functional block diagram of the management device 1.
Figure 8:
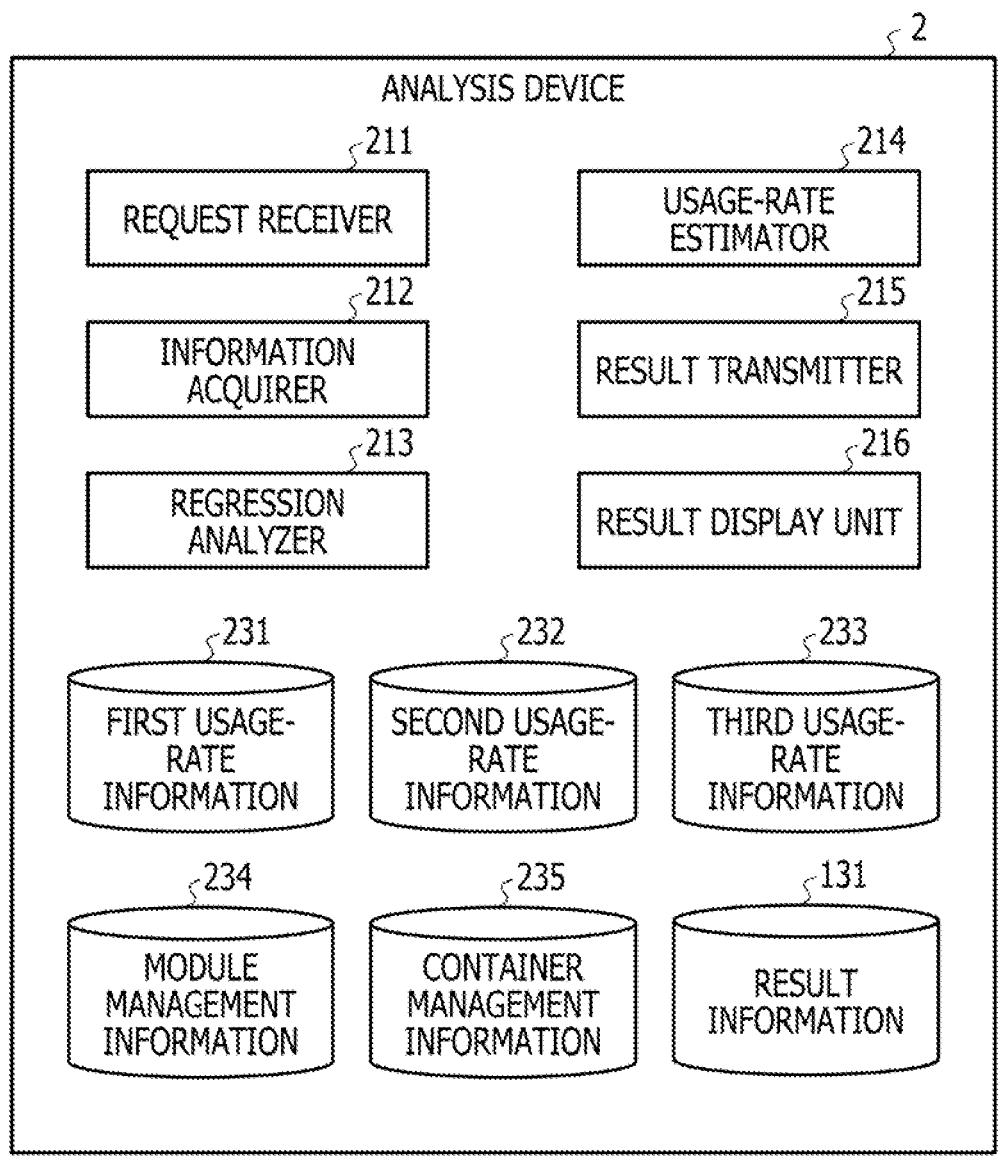
FIG. 8 is a functional block diagram of the analysis device 2.

Next, the functions of the information processing system 10 will be described. FIG. 7 is a functional block diagram of the management device 1. In addition, FIG. 8 is a functional block diagram of the analysis device 2.

First, the functional block diagram of the management device 1 will be described.

As illustrated in FIG. 7, for example, in organic collaboration between the hardware such as the CPU 101 and the memory 102 and the program 110, the management device 1 achieves various types of functions including a request transmitter 111, a result receiver 112, an arrangement changer 113, and a communication restrainer 114.

Furthermore, for example, as illustrated in FIG. 7, the management device 1 stores result information 131, total usage-rate information 132, threshold information 133, and communication restraint information 134 in the information storage area 130.

The request transmitter 111 transmits an analysis request regarding the usage status of the CPU (e.g., CPU 301 of the host 3 and CPU 401 of the host 4) to the analysis device 2.

The result receiver 112 receives, from the analysis device 2, the result information 131 that is the analysis result corresponding to the analysis request transmitted by the request transmitter 111.

The arrangement changer 113 changes the arrangement of each container (virtual machine on which each container operates) on the basis of the result information 131 received by the result receiver 112, for example. For example, the arrangement changer 113 specifies a container that is determined to have a large load on the CPU from the result information 131 received by the result receiver 112, and moves the specified container to another host, for example.

The communication restrainer 114 restrains communication performed by each container on the basis of the result information 131 received by the result receiver 112, for example. For example, the communication restrainer 114 specifies a container that is determined to have a large load on the CPU from the result information 131 received by the result receiver 112, and restrains the communication performed by the specified container, for example. The total usage-rate information 132, the threshold information 133, and the communication restraint information 134 will be described below.

Next, the functional block diagram of the analysis device 2 will be described.

As illustrated in FIG. 8, for example, in organic collaboration between the hardware such as CPU 201 and memory 202 and the program 210, the analysis device 2 achieves various types of functions including a request receiver 211, an information acquirer 212, a regression analyzer 213, a usage-rate estimator 214, a result transmitter 215, and a result display unit 216.

Furthermore, for example, as illustrated in FIG. 8, the analysis device 2 stores first usage-rate information (first information) 231, second usage-rate information (second information) 232, third usage-rate information (third information) 233, module management information 234, container management information 235, and the result information 131 in the information storage area 230.

The request receiver 211 receives the analysis request regarding the CPU usage status transmitted from the management device 1.

The information acquirer 212 acquires the first usage-rate information 231 indicating the CPU usage rate in the predetermined time zone (e.g., for the latest 1 minute) of each container. For example, the information acquirer 212 acquires the first usage-rate information 231 for a module in execution in each container (hereinafter, also referred to as an execution module), or the like.

Furthermore, the information acquirer 212 acquires the second usage-rate information 232 indicating the CPU usage rate in the predetermined time zone of the communication process of each virtual machine.

The regression analyzer 213 performs a regression analysis (multiple regression analysis) with the first usage-rate information 231 and the second usage-rate information 232 acquired by the information acquirer 212 and calculates a regression coefficient.

With the regression coefficient calculated by the regression analyzer 213, the usage-rate estimator 214 generates (estimates), for each container, the third usage-rate information 233 indicating the CPU usage rate in the predetermined time zone of the communication process associated with the communication performed by each container.

The result transmitter 215 transmits, for example, the result information 131 including the third usage-rate information 233 generated by the usage-rate estimator 214 to the management device 1.

The result display unit 216 causes the display device (not illustrated) to display, for example, the result information 131 including the first usage-rate information 231 acquired by the information acquirer 212 and the third usage-rate information 233 generated by the usage-rate estimator 214. The module management information 234 and the container management information 235 will be described below.

Overview of First Embodiment

Figure 9:
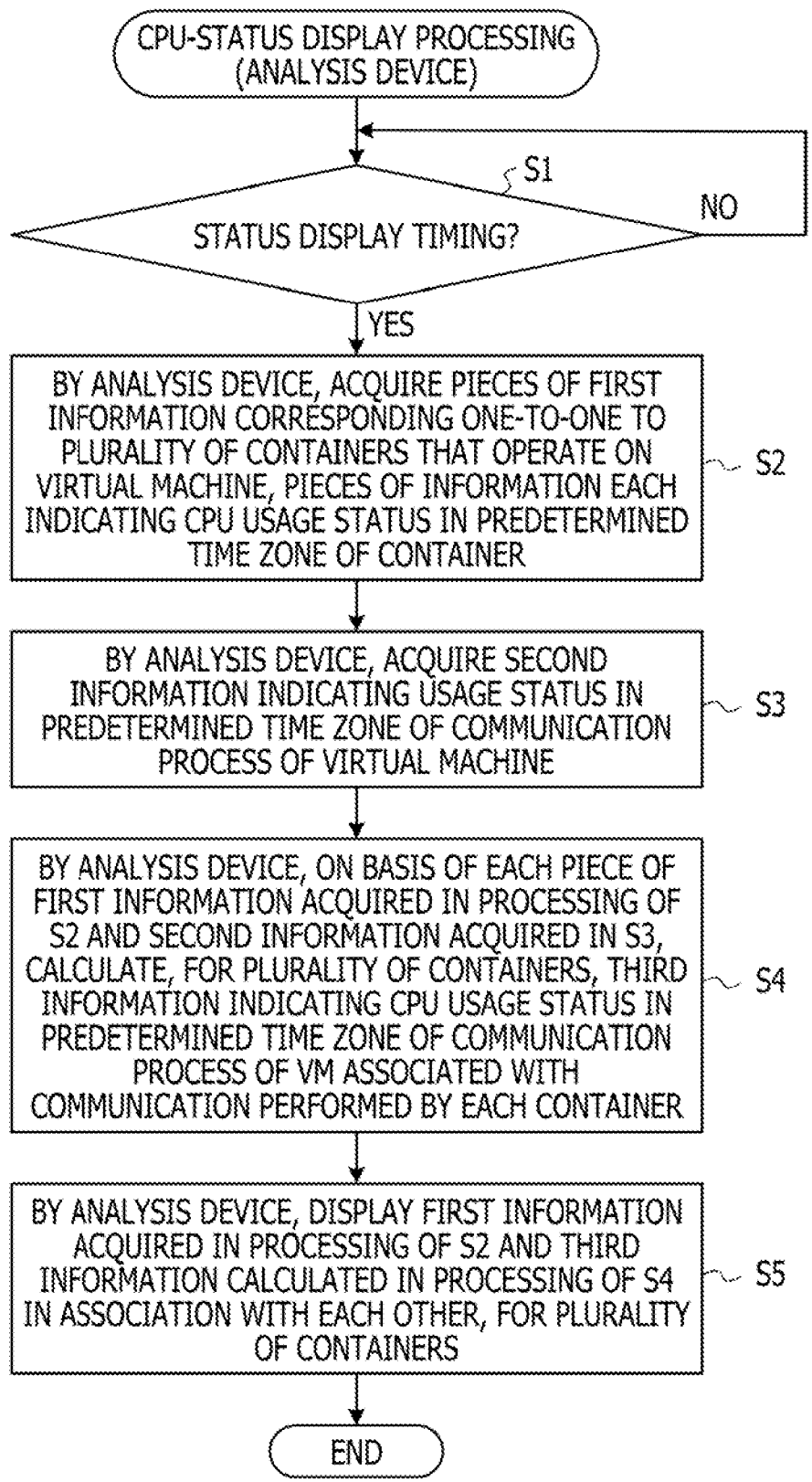
FIG. 9 is an explanatory flowchart illustrating the overview of central processing unit (CPU)-status display processing according to a first embodiment.
Figure 10:
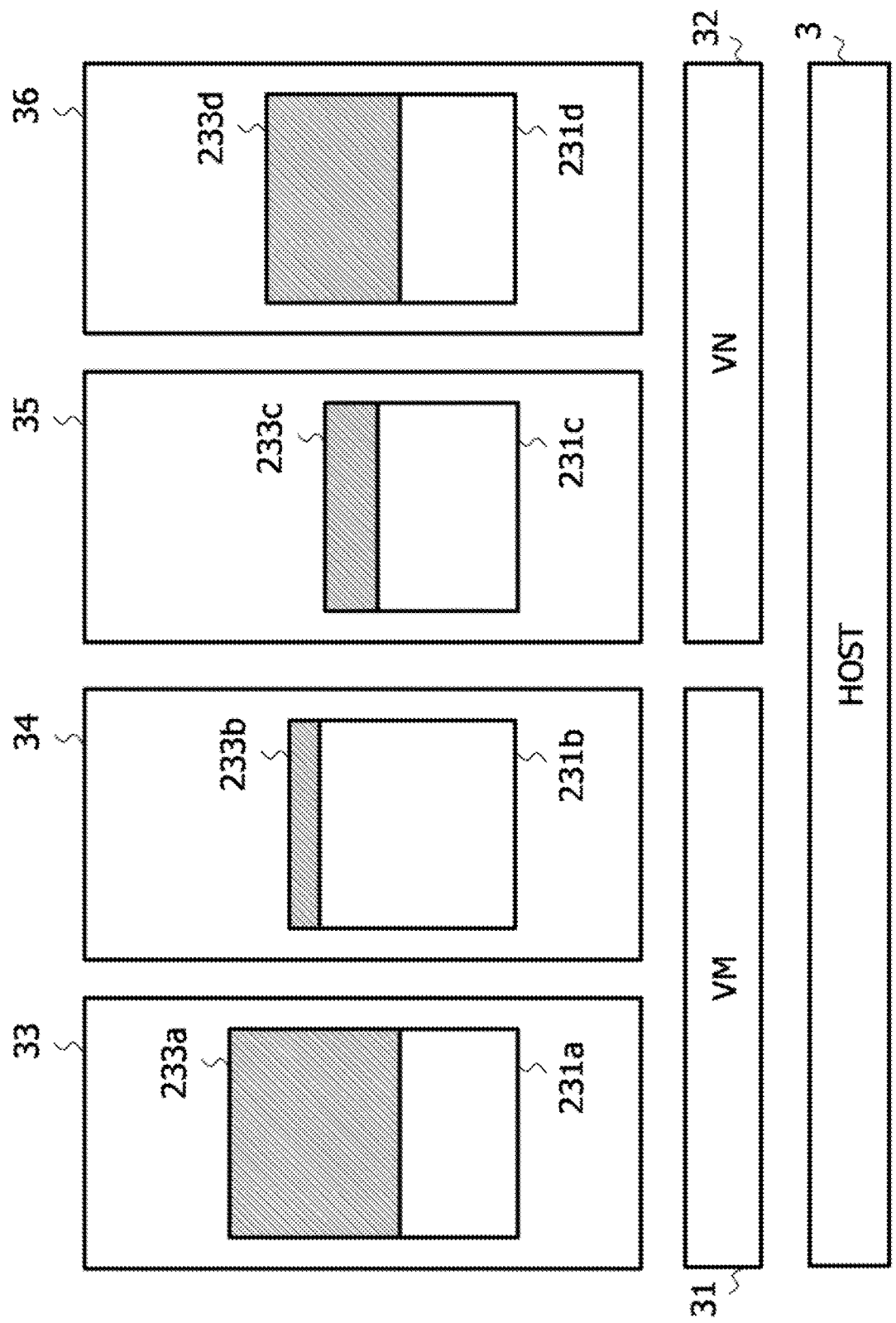
FIG. 10 is an explanatory diagram illustrating the overview of the CPU-status display processing according to the first embodiment.

Next, the overview of the first embodiment will be described. FIG. 9 is an explanatory flowchart illustrating the overview of the CPU-status display processing according to the first embodiment. FIG. 10 is an explanatory diagram illustrating the overview of the CPU-status display processing according to the first embodiment.

As illustrated in FIG. 9, the analysis device 2 waits until, for example, the status display timing occurs (NO in S1). The status display timing may be, for example, the timing of inputting, by the business operator, information regarding that the CPU-status display processing is to be performed, to the analysis device 2.

Then, when the status display timing occurs (YES in S1), the analysis device 2 acquires the pieces of first information corresponding one-to-one to a plurality of containers that operate on the virtual machine, the pieces of first information each indicating the CPU usage status in the predetermined time zone of the container (S2).

Furthermore, in this case, the analysis device 2 acquires the second information indicating the CPU usage status in the predetermined time zone of the communication process of the virtual machine (S3).

Subsequently, on the basis of each piece of the first information acquired in the processing of S2 and the second information that are acquired in the processing of S3, the analysis device 2 calculates, for the plurality of containers, the third information indicating the CPU usage status in the predetermined time zone of the communication process of the virtual machine associated with the communication performed by each container (S4).

Thereafter, the analysis device 2 displays the first information acquired in the processing of S2 and the third information calculated in the processing of S4 in association with each other, for the plurality of containers (S5).

In other words, for example, the processing load in the communication process of each virtual machine is the total value of the load due to the communication performed by each container that operates on the virtual machine. Furthermore, for example, the processing load in the communication process of each virtual machine can be replaced with the CPU load associated with the operation of the communication process of the virtual machine.

Thus, the analysis device 2 acquires the second information indicating the CPU load associated with the operation of the communication process of each virtual machine. Then, with the first information indicating the CPU load associated with the operation of each container in addition to the acquired second information, the analysis device 2 calculates the third information indicating the CPU load caused by the communication performed by each container, and displays the calculated third information.

This arrangement enables the analysis device 2 to display, for example, the CPU load measured from each container (first information) and the CPU load due to the communication performed by each container (third information) in association with each other. For example, as illustrated in FIG. 10, the analysis device 2 can display, for example, first usage-rate information (first information) 231a measured from the container 33 and third usage-rate information (third Information) 233a calculated for the container 33 summed together. Furthermore, as illustrated in FIG. 10, the analysis device 2 can display, for example, first usage-rate information 231b measured from the container 34 and third usage-rate information 233b calculated for the container 34 summed together.

Thus, for example, the administrator browses the contents on the display device (not illustrated) displayed by the analysis device 2, so that the administrator can accurately specify a container in a high load status (container that has a great influence on the host). For example, the administrator browses the contents illustrated in FIG. 10, so that the administrator can determine, for example, that the CPU load associated with the operation of the container 33 is larger than the CPU load associated with the operation of the container 34.

Details of First Embodiment

Next, the details of the first embodiment will be described. FIGS. 11 to 14 are explanatory flowcharts illustrating the details of the CPU-status display processing according to the first embodiment. In addition, FIGS. 15 to 21 are explanatory tables and a graph illustrating the details of the CPU-status display processing according to the first embodiment.

[CPU-Status Display Processing in Management Device (1)]

Figure 11:
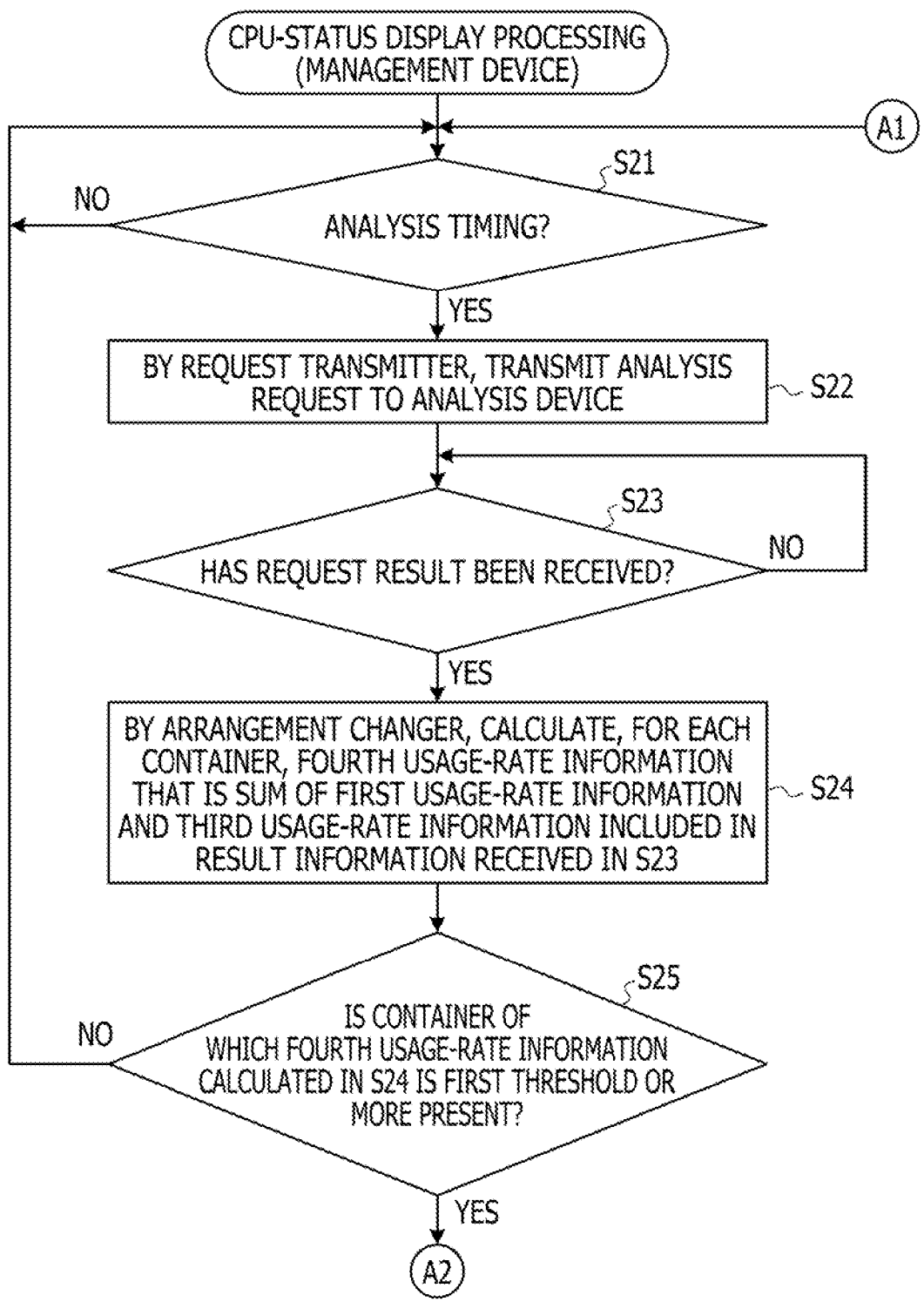
FIG. 11 is an explanatory flowchart illustrating the details of the CPU-status display processing according to the first embodiment.
Figure 12:
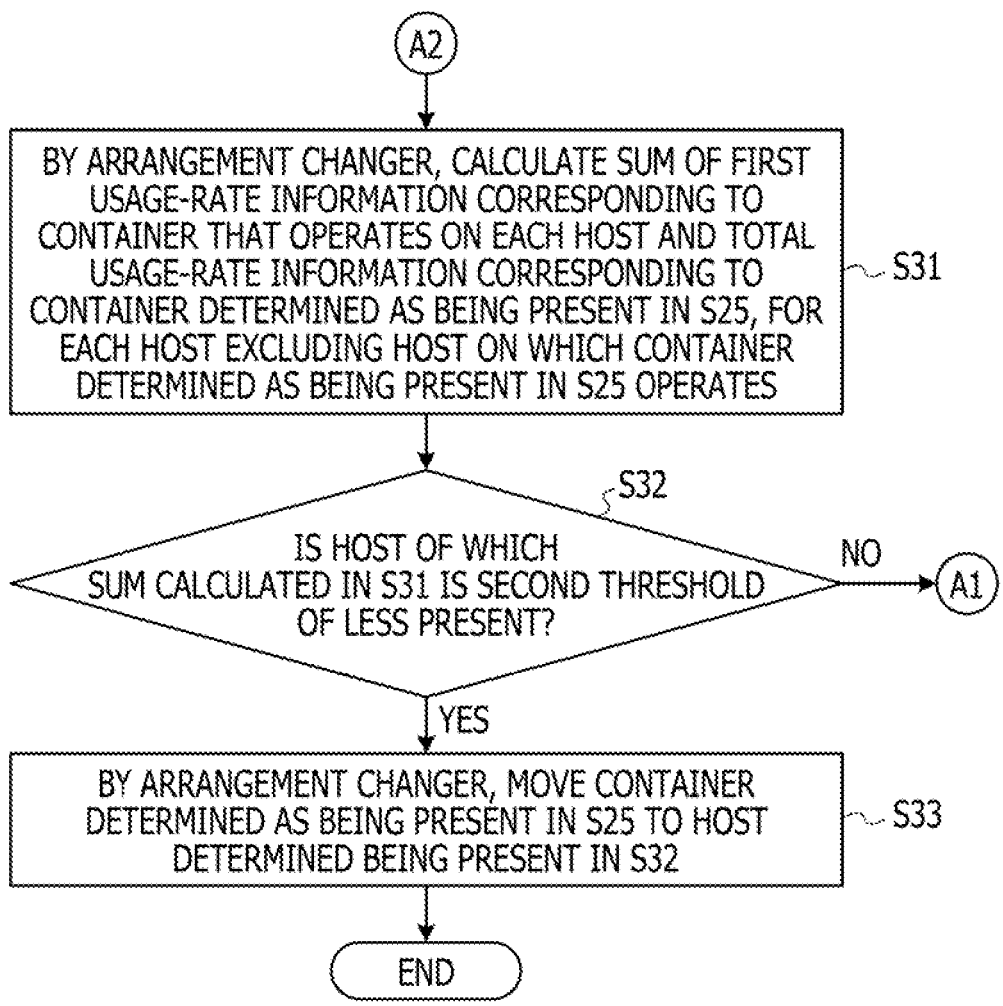
FIG. 12 is an explanatory flowchart illustrating the details of the CPU-status display processing according to the first embodiment.

First, of the CPU-status display processing, part of the processing performed in the management device 1 will be described. FIGS. 11 and 12 are the explanatory flowcharts illustrating the CPU-status display processing in the management device 1.

As illustrated in FIG. 11, the request transmitter 111 of the management device 1 waits until an analysis timing occurs (NO in S21). The analysis timing may be, for example, the timing of inputting, by the business operator, information regarding that the CPU usage status is to be analyzed, to the management device 1. Furthermore, the analysis timing may be, for example, the timing every minute, or the like.

Then, when the analysis timing occurs (YES in S21), the request transmitter 111 transmits an analysis request to the analysis device 2 (S22).

[CPU-Status Display Processing in Analysis Device]

Figure 13:
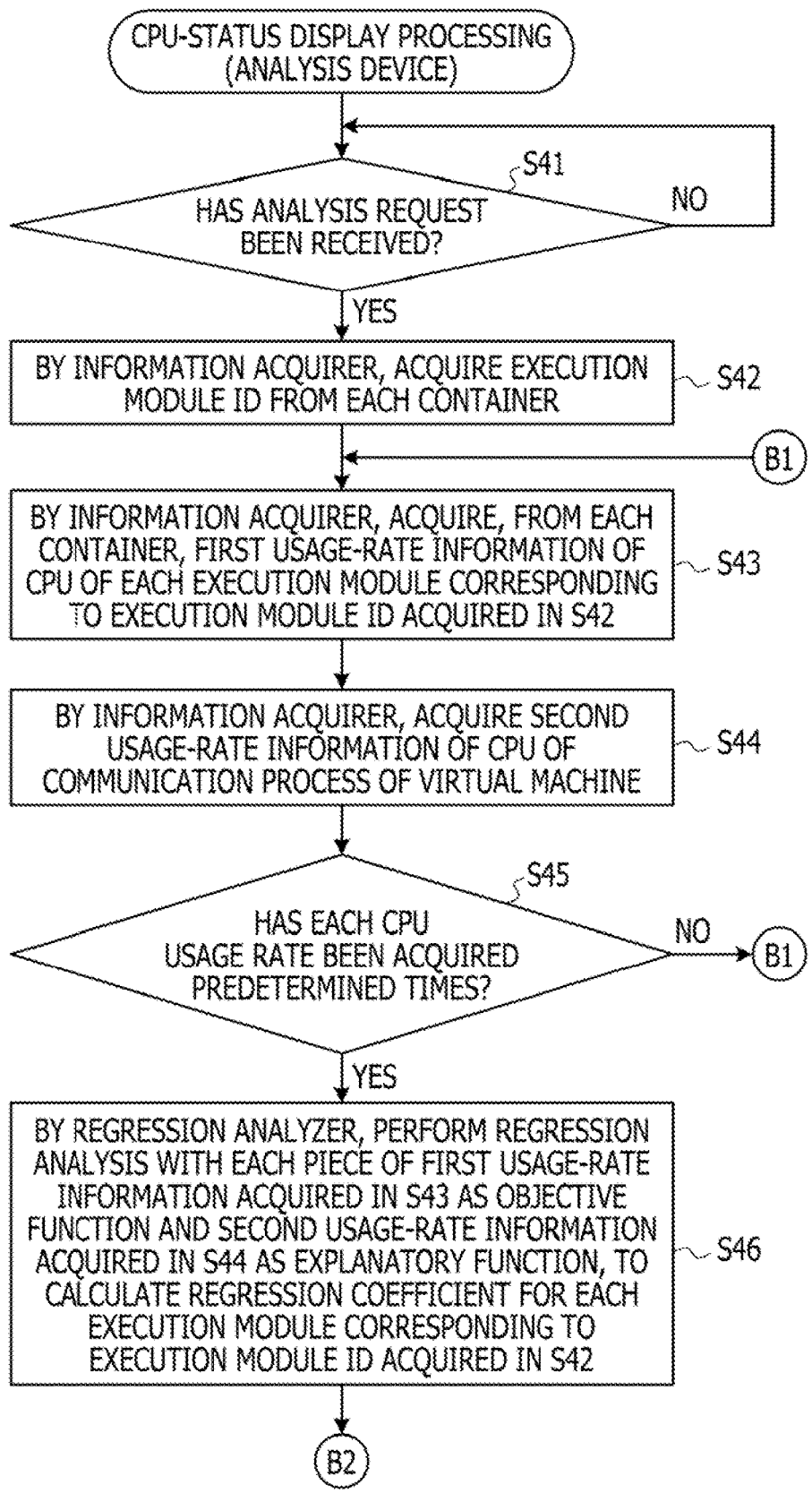
FIG. 13 is an explanatory flowchart illustrating the details of the CPU-status display processing according to the first embodiment.
Figure 14:
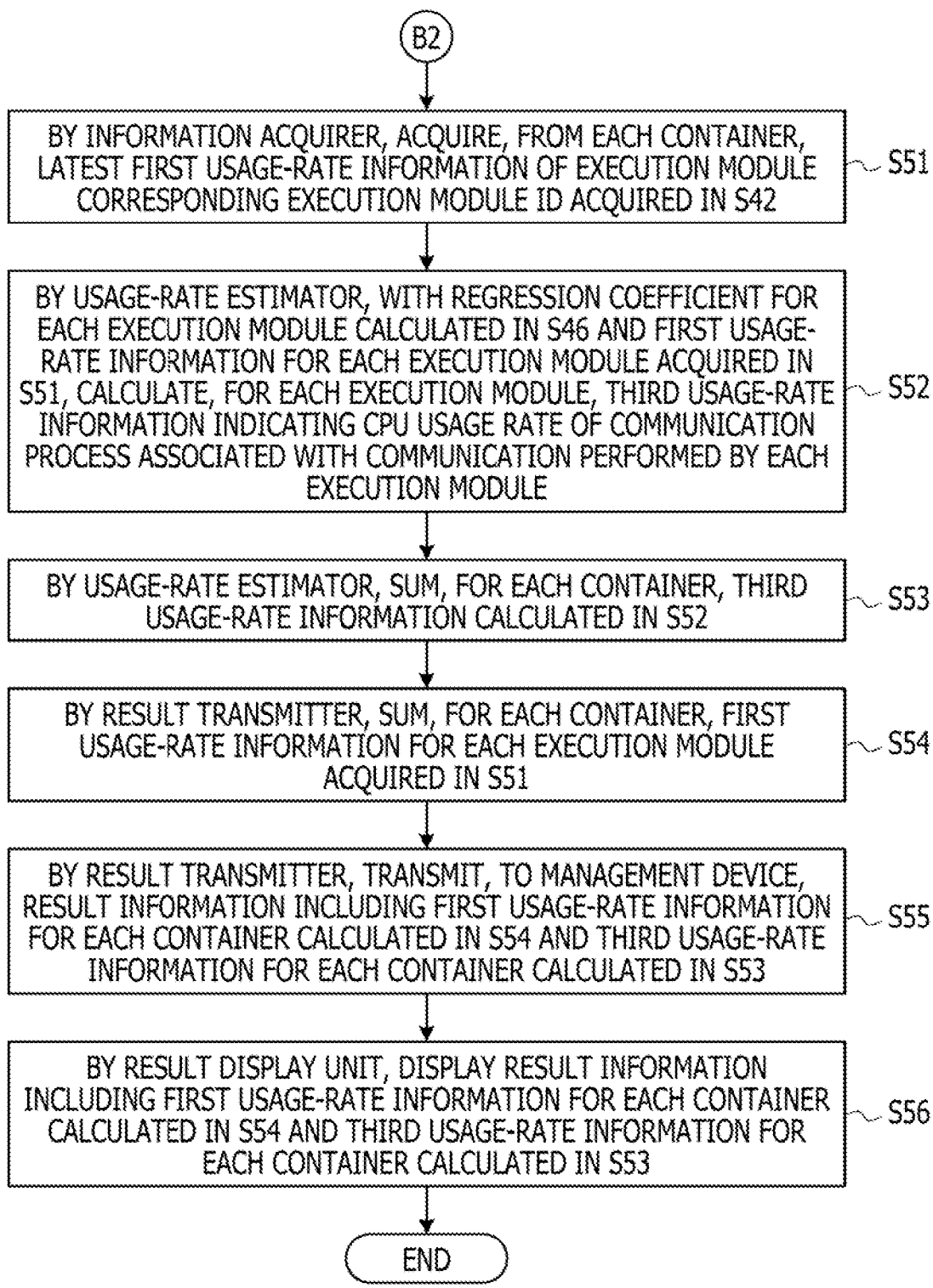
FIG. 14 is an explanatory flowchart illustrating the details of the CPU-status display processing according to the first embodiment.

Next, of the CPU-status display processing, processing performed by the analysis device 2 will be described. FIGS. 13 and 14 are the explanatory flowcharts illustrating the CPU-status display processing in the analysis device 2.

As illustrated in FIG. 13, the request receiver 211 of the analysis device 2 waits until the reception of the analysis request from the management device 1 (NO in S41).

Then, in a case where the request receiver 211 has received the analysis request from the management device 1 (YES in S41), the information acquirer 212 of the analysis device 2 acquires an ID indicating an execution module of each container (hereinafter, also referred to as an execution module ID), from the container (S42). For example, the information acquirer 212 acquires the execution module IDs from all the containers managed by the management device 1.

Note that in this case, the information acquirer 212 generates module management information 234 including the execution module ID acquired from each container, for example. Hereinafter, a specific example of the module management information 234 will be described.

[Specific Example of Module Management Information]

FIG. 15 is the explanatory table illustrating the specific example of the module management information 234.

The module management information 234 indicated in FIG. 15 has, as items, "container ID" to which the ID of each container is set and "execution module ID" to which the ID of each execution module is set.

For example, in the module management information 234 indicated in FIG. 15, "C001" as the "container ID", and "M001" and "M002" as the "execution module ID" are set to the information in the first row.

Furthermore, in the module management information 234 indicated in FIG. 15, "C002" as the "container ID", and "M003" and "M004" as the "execution module ID" are set to the information in the second row. The description of other information included in FIG. 15 will be omitted.

Referring back to FIG. 13, the information acquirer 212 acquires, from each container, the first usage-rate information 231 indicating the CPU usage rate of each execution module corresponding to the execution module ID acquired in the processing of S42 (S43). Hereinafter, a specific example of the first usage-rate information 231 will be described.

[Specific Example of First Usage-Rate Information]

FIG. 16 is the explanatory table illustrating the specific example of the first usage-rate information 231. FIG. 16 is a specific example of the first usage-rate information 231 of the execution modules on the host 3. Note that in the following description, it is assumed that there is one execution module in each container (containers 33, 34, and 35) that operates on the host 3.

The first usage-rate information 231 indicated in FIG. 16 has, as items, "time" to which each time is set and "module 33a" to which the first usage-rate information 231 corresponding to a module 33a in the container 33 is set. Furthermore, the first usage-rate information 231 indicated in FIG. 16 has, as items, "module 34a" to which the first usage-rate information 231 corresponding to a module 34a in the container 34 is set and "module 35a" to which first usage-rate information 231 corresponding to a module 35a in the container 35 is set.

For example, in the first usage-rate information 231 indicated in FIG. 16, "10:00:00" as the "time", "66(%)" as the "module 33a", "59(%)" as the "module 34a", and "11(%)" as the "module 35a" are set to the information in the first row.

Furthermore, in the first usage-rate information 231 indicated in FIG. 16, "10:00:10" as the "time", "65(%)" as the "module 33a", "30(%)" as the "module 34a", and "17(%)"

as the "module 35a" are set to the information in the second row. The description of other information included in FIG. 16 will be omitted.

Referring back to FIG. 13, the information acquirer 212 acquires the second usage-rate information 232 indicating the CPU usage rate of the communication process of each virtual machine, from the host (S44).

It is determined whether each CPU usage rate has been acquired predetermined time (S45).

Hereinafter, a specific example of the second usage-rate information 232 will be described.

[Specific Example of Second Usage-Rate Information]

FIG. 17 is the explanatory table illustrating the specific example of the second usage-rate information 232. FIG. 17 is a specific example of the second usage-rate information 232 regarding the host 3. Note that in the following description, it is assumed that the second usage-rate information 232 is acquired from the communication process (virtual switch 37) that operates on the host 3.

The second usage-rate information 232 indicated in FIG. 17 has, as items, "time" to which each time is set and "communication process" to which the second usage-rate information 232 corresponding to the communication process of each virtual machine is set.

For example, in the second usage-rate information 232 indicated in FIG. 17, "10:00:00" as the "time" and "36(%)" as the "communication process" are set to the information in the first row.

Furthermore, in the second usage-rate information 232 indicated in FIG. 17, "10:00:10" as the "time" and "26(%)" as the "communication process" are set to the information in the second row. The description of other information included in FIG. 17 will be omitted.

Referring back to FIG. 13, the regression analyzer 213 of the analysis device 2 performs a regression analysis with each piece of the first usage-rate information 231 acquired in the processing of S43 as an objective function and the second usage-rate information 232 acquired in the processing of S44 as an explanatory function, to calculate a regression coefficient for each execution module corresponding to the execution module ID acquired in the processing of S42 (S46). Hereinafter, a specific example of the processing of S46 will be described.

[Specific Example of Processing of S46]

The regression analyzer 213 calculates the regression coefficient for each execution module b following Expressions (1) to (3) below, for example.

$$y = \beta_1 x_1 + \ldots + \beta_N x_N + \epsilon \qquad \text{(Expression 1)}$$

$$\min_{\beta} J(\beta) = \|Y - X\beta\|_2^2 \qquad \text{(Expression 2)}$$

$$\hat{\beta} = (X^T X)^{-1} X^T Y \qquad \text{(Expression 3)}$$

In the above Expressions (1) to (3), y represents the second usage-rate information 232 corresponding to the communication process, $x_i$ represents the first usage-rate information 231 corresponding to the i-th execution module, $\beta_i$ represents the regression coefficient corresponding to the i-th execution module, and $\epsilon$ represents an error. Furthermore, in the above Expressions (1) to (3), $\beta$ represents a matrix containing, as elements, the regression coefficients corresponding one-to-one to the execution modules, X represents a matrix containing, as elements, the pieces of the first usage-rate information 231 corresponding one-to-one to the execution modules, and Y represents a matrix containing, as elements, the pieces of the second usage-rate information 232 corresponding one-to-one to the communication processes.

Then, each $\beta_i$ corresponding to the execution module is obtained by performing a multiple regression analysis such that $\epsilon$ in the above Expression (1) is minimized. For example, each $\beta_i$ corresponding to the execution module is given as $\beta$ that minimizes the above Expression (2), and is generally obtained by solving the above Expression (3).

Here, in the first usage-rate information 231 described with reference to FIG. 16 and the second usage-rate information 232 described with reference to FIG. 17, "66(%)", "59(%)", "11(%)", and "36(%)" are set, respectively, to the "module 33a", the "module 34a", the "module 35a", and the "communication process" corresponding to the information including the "time" of "10:00:00". In addition, "65(%)", "30(%)", "17(%)", and "26(%)" are set, respectively, to the "module 33a", the "module 34a", the "module 35a", and the "communication process" corresponding to the information including the "time" of "10:00:10", and "50(%)", "83(%)", "40(%), and "58(%)" are set, respectively, to the "module 33a", the "module 34a", the "module 35a", and the "communication process" corresponding to the information including the "time" of "10:00:20". Furthermore, "46(%)", "65(%)", "33(%)", and "37(%)" are set, respectively, to the "module 33a", the "module 34a", the "module 35a", and the "communication process" corresponding to the information including the "time" of "10:00:30".

Thus, the regression analyzer 213 assigns each value to the above Expression (1) to generate the following Expression (4).

[Mathematical Expression 4]

$$36 = 66 \times \beta_1 + 59 \times \beta_2 + 11 \times \beta_3 + \epsilon$$

$$26 = 65 \times \beta_1 + 30 \times \beta_2 + 17 \times \beta_3 + \epsilon$$

$$58 = 50 \times \beta_1 + 83 \times \beta_2 + 40 \times \beta_3 + \epsilon$$

$$37 = 46 \times \beta_1 + 65 \times \#_2 + 33 \times \beta_3 + \epsilon \qquad \text{(Expression 4)}$$

Then, the regression analyzer 213 performs a multiple regression analysis such that $\epsilon$ in the above Expression (4) is minimized. Specifically, the regression analyzer 213 solves the following Expression (5) to obtain each of $\beta_1$ to $\beta_3$, for example.

$$Y = \begin{pmatrix} 36 \\ 26 \\ 58 \\ 37 \end{pmatrix}, X = \begin{pmatrix} 66 & 59 & 11 \\ 65 & 30 & 17 \\ 50 & 83 & 40 \\ 46 & 65 & 33 \end{pmatrix}, X^T = \begin{pmatrix} 66 & 65 & 50 & 46 \\ 59 & 30 & 83 & 40 \\ 11 & 46 & 17 & 33 \end{pmatrix}, \beta = \begin{pmatrix} \beta_1 \\ \beta_2 \\ \beta_3 \end{pmatrix}$$

$$\hat{\beta} = \begin{pmatrix} \hat{\beta}_1 \\ \hat{\beta}_2 \\ \hat{\beta}_3 \end{pmatrix} = (X^T X)^{-1} X^T Y = \begin{pmatrix} 0.1 \\ 0.45 \\ 0.27 \end{pmatrix}$$

(Expression 5)

Figure 18:
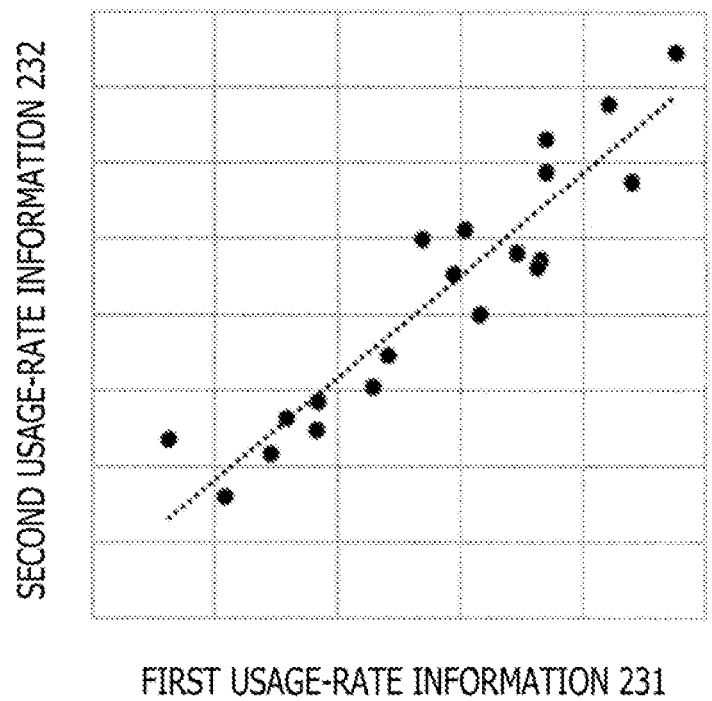
FIG. 18 is an explanatory graph illustrating the details of the CPU-status display processing according to the first embodiment.

Note that, for example, when the access frequency between each host (host 3 or host 4) and another host (host on which another container that provides other services operates) is high, as indicated in FIG. 18, the correlation between the first usage-rate information 231 acquired in the processing of S44 (values on the horizontal axis in FIG. 18) and the second usage-rate information 232 acquired in the processing of S43 (values on the vertical axis in FIG. 18) is high. Thus, in such a case, the regression analyzer 213 can estimate with higher accuracy the regression coefficients corresponding one-to-one to the execution modules.

Next, as illustrated in FIG. 14, the information acquirer 212 acquires, from each container, the latest first usage-rate information 231 of the execution module corresponding to the execution module ID acquired in the processing of S42 (S51).

Thereafter, with the regression coefficient for each execution module calculated in the processing of S46 and the first usage-rate information 231 for each execution module acquired in the processing of S51, the usage-rate estimator 214 of the analysis device 2 calculates, for each execution module, the third usage-rate information 233 indicating the CPU usage rate of the communication process associated with the communication performed by each execution module (S52).

Then, the usage-rate estimator 214 calculates, for each container, the total of the third usage-rate information 233 calculated in the processing of S52 (S53). Hereinafter, specific examples of the processing of S52 and S53 will be described.

[Specific Examples of Processing of S52 and S53]

The usage-rate estimator 214 calculates the third usage-rate information 233 for each container by following Expression (6) below, for example.

$$\hat{y}_{Container} = \sum_{i \in Container}^{i} \hat{\beta}_i x_i \quad \text{(Expression 6)}$$

Specifically, for example, when the regression coefficients corresponding one-to-one to the module 33a, the module 34a, and the module 35a (regression coefficients calculated in the processing of S46) are "0.1", "0.45", and "0.27" and the pieces of the latest first usage-rate information 231 corresponding one-to-one to the module 33a, the module 34a, and the module 35a (first usage-rate information 231 acquired in the processing of S51) are "30(%)", "20(%)", and "10(%)", the regression analyzer 213, for example, as indicated in the following Expression (7), calculates "3.0 (%)", "9.0(%)", and "2.8(%)" as the total of the respective pieces of the third usage-rate information 233 of the container 33, the container 34, and the container 35.

[Mathematical Expression 7]

$$\hat{y}_{Container1} = \hat{\beta}_1 x_1 = 0.1 \times 30 = 3.0$$

$$\hat{y}_{Container2} = \hat{\beta} x_2 = 0.45 \times 20 = 9.0$$

$$\hat{y}_{Container3} = \hat{\beta}_3 x_3 = 0.28 \times 10 = 2.7 \quad \text{(Expression 7)}$$

Referring back to FIG. 14, the result transmitter 215 of the analysis device 2 calculates, for each container, the total of the first usage-rate information 231 for each execution module acquired in the processing of S51 (S54). Specifically, the result transmitter 215 calculates the first usage-rate information 231 for each container by following Expression (8) below, for example.

$$x_{Container} = \sum_{i \in Container}^{i} x_i \quad \text{(Expression 8)}$$

Then, the result transmitter 215 transmits, to the management device 1, the result information 131 including the first usage-rate information 231 for each container calculated in the processing of S54 and the third usage-rate information 233 for each container calculated in the processing of S53 (S55).

Furthermore, the result display unit 216 of the analysis device 2 causes the display device (not illustrated) to display the result information 131 including the first usage-rate information 231 for each container calculated in the processing of S54 and the third usage-rate information 233 for each container calculated in the processing of S53 (S56). Hereinafter, a specific example of the result information 131 will be described.

[Specific Example of Result Information]

FIG. 19 is the explanatory table illustrating the specific example of the result information 131.

The result information 131 indicated in FIG. 19 has, as items, "VMID" for identifying each virtual machine, "container 33", "container 34", and "container 35". Information corresponding to the container 33 is set to the "container 33". Information corresponding to the container 34 is set to the "container 34". Information corresponding to the container 35 is set to the "container 35". Furthermore, each of the items "container 33", "container 34", and "container 35" has, as sub items, "container" and "communication". The first usage-rate information 231 for each container (total of the first usage-rate information 231 calculated in the processing of S54) is set to the "container". The third usage-rate information 233 for each container (total of the third usage-rate information 233 calculated in the processing of S53) is set to the "communication".

For example, in the result information 131 indicated in FIG. 19, "VM31" as the "VMID"; "30(%)" as the "container" and "3.0(%)" as the "communication" corresponding to the "container 33"; and "20(%)" as the "container" and "9.0(%)" as the "communication" corresponding to the "container 34" are set to the information in the first row.

Furthermore, in the result information 131 indicated in FIG. 19, "VM32" as the "VMID"; and "10(%)" as the "container" and "2.8(%)" as the "communication" corresponding to "container 35" are set to the information in the second row.

Note that in the processing of S54, the result transmitter 215 may refer to the container management information 235 stored in the information storage area 130 and may specify the virtual machine on which each container operates, for example. Hereinafter, a specific example of the container management information 235 will be described below.

[Specific Example of Container Management Information]

FIG. 20 is the explanatory table illustrating the specific example of the container management information 235.

The container management information 235 indicated in FIG. 20 has, as items, "VMID" to which the ID of each virtual machine is set and "container ID" to which the ID of each container is set.

For example, in the container management information 235 indicated in FIG. 20, "V001" as the "VMID" and "C001" as the "container ID" are set to the information in the first row.

Furthermore, in the container management information 235 indicated in FIG. 20, "V001" as the "VMID" and "C002" as the "container ID" are set to the information in the second row. The description of other information included in FIG. 20 will be omitted.

[CPU-Status Display Processing in Management Device (2)]

Next, of the CPU-status display processing, the other part of the processing performed in the management device 1 will be described.

As illustrated in FIG. 11, the result receiver 112 of the management device 1 waits until the reception of the result information 131 transmitted from the analysis device 2 (NO in S23).

Then, in a case where the result information 131 transmitted from the analysis device 2 has been received (YES in S23), the arrangement changer 113 of the management device 1 calculates, for each container, the total usage-rate information 132 (hereinafter, also referred to as fourth usage-rate information 132) that is the sum of the first usage-rate information 231 and the third usage-rate information 233 included in the result information 131 received in the processing of S23 (S24).

Note that before calculating the sum of the first usage-rate information 231 and the third usage-rate information 233, the arrangement changer 113 may multiply at least one of the first usage-rate information 231 and the third usage-rate information 233 by a predetermined coefficient.

Subsequently, the arrangement changer 113 determines whether or not a container of which the total usage-rate information 132 calculated in the processing of S24 is a movement-source threshold or more (hereinafter, also referred to as first threshold) is present (S25).

For example, the arrangement changer 113 refers to the movement-source threshold included in the threshold information 133 stored in the information storage area 130, and determines whether or not a container of which the total usage-rate information 132 calculated in the processing of S24 is the movement-source threshold or more is present.

For example, in the processing in S25, the arrangement changer 113 determines whether or not a container that has a large influence on the host (container that can be determined that the container is desirable to be moved to another virtual machine) is present. Hereinafter, a specific example of the threshold information 133 will be described.

[Specific Example of Threshold Information]

FIG. 21 is the explanatory table illustrating the specific example of the threshold information 133.

The threshold information 133 indicated in FIG. 21 has, as items, "movement-source threshold" and "movement-destination threshold". The "movement-source threshold" is a threshold to which the arrangement changer 113 refers in determination whether or not each container is moved to another virtual machine. The "movement-destination threshold" is a threshold to which the arrangement changer 113 refers in determination whether or not each host can accept a container from another host.

For example, in the threshold information 133 indicated in FIG. 21, "30(%)" as the "movement-source threshold" and "50(%)" as the "movement-destination threshold" are set, respectively.

Referring back to FIG. 11, in a case where it is determined that no container of which the total usage-rate information 132 calculated in the processing of S24 is the movement-source threshold or more is present (NO in S25), the request transmitter 111 performs the processing from S21 again.

On the other hand, in a case where it is determined that a container of which the total usage-rate information 132 calculated in the processing of S24 is the movement-source threshold or more (YES in S25), as illustrated in FIG. 12, the arrangement changer 113 calculates the sum of the first usage-rate information 231 corresponding to each of the containers that operates on each host and the total usage-rate information 132 corresponding to the container determined as being present in the processing of S25, for each host excluding the host on which the container determined as being present in the processing of S25 operates (S31).

Note that in the processing of S25, for example, in a case where it is determined that a plurality of containers each of which the total usage-rate information 132 calculated in the processing of S24 is the movement-source threshold or more is present, the arrangement changer 113 may perform the processing from S31 for the container with the largest total usage-rate information 132 calculated in the processing of S24.

Furthermore, the arrangement changer 113 may perform the processing from S31 only in a case where the CPU usage rate of the host on which the container determined as being present in the processing of S25 operates exceeds a predetermined threshold, for example.

Then, the arrangement changer 113 determines whether or not a host of which the sum calculated in the processing of S31 is the movement-destination threshold or less is present (S32).

Specifically, the arrangement changer 113 refers to, for example, the move destination threshold included in the threshold information 133 described with reference to FIG. 21, and determines whether or not a host of which the sum calculated in the processing of S31 is the movement-destination threshold or less is present.

For example, the arrangement changer 113 determines whether or not another host that can move the container determined as being present in the processing of S25 is present.

Note that the arrangement changer 113 may perform the processing of S32 only for another host on which another virtual machine operates is present, the other virtual machine forming a duster with the virtual machine on which the container determined as being present in the processing of S25 operates, for example.

Then, in a case where it is determined that no host of which the sum calculated in the processing of S31 the movement-destination threshold or less is present (NO in S32), the request transmitter 111 performs the processing from S21 again.

On the other hand, in a case where it is determined that a host of which the sum calculated in the processing of S31 is the movement-destination threshold or less is present (YES in S32), the arrangement changer 113 moves the container determined as being present in the processing of S25 to the host determined as being present (533).

For example, in the result information 131 described with reference to FIG. 19, the total CPU usage rate obtained by adding "30(%)" set to the "container" corresponding to the "container 33" and "3.0(%)" set to the "communication" corresponding to the "container 33" is "33(%)". In addition, the total CPU usage rate obtained by adding "20(%)" set to the "container" corresponding to the "container 34" and "9.0(%)" set to the "communication" corresponding to the "container 34" is "29(%)". The total CPU usage rate obtained by adding "10(%)" set to the "container" corresponding to the "container 35" and "2.8 (%" set to the "communication" corresponding to the "container 35" is "12.8(%)". Furthermore, in the threshold information 133 described with reference to FIG. 21, "30(%)" and "50(%)" are set to the "movement-source threshold" and the "movement-destination threshold", respectively.

Thus, in this case, the arrangement changer 113 specifies the container 33 of which the total CPU usage rate is 30(%) or more, as a container that is desirable to be moved to another virtual machine, for example.

Then, for example, in a case where the sum of the present CPU usage rate of the host 4 and "33(%)" that is the total CPU usage rate corresponding to the container 33 is less than "50(%)", the arrangement changer 113 moves the container 33 to the host 4.

As described above, the analysis device 2 in the present embodiment acquires, for example, each piece of the first information indicating the CPU usage status in the predetermined time zone of the plurality of containers (container 33, container 34, and container 35) that operate on the virtual machine 31 and the virtual machine 32. Furthermore, the analysis device 2 acquires, for example, the second information indicating the CPU usage status in the predetermined time zone of the communication process (virtual switch 37) of the virtual machine 31 and the virtual machine 32.

Then, on the basis of each piece of the first information and the second Information, the analysis device 2 calculates the third Information indicating the CPU usage status in the predetermined time zone of the communication process associated with the communication performed by each container, for a plurality of containers that operate on the virtual machine 31 and the virtual machine 32.

Thereafter, the analysis device 2 causes the display device (not illustrated) to display the first information and the third information in association with each other, for the plurality of containers that operate on the virtual machine 31 and the virtual machine 32, for example.

In other words, for example, in the example described with reference to FIG. 1, the load associated with the communication via the virtual switch 37 is the total value of the load due to the communication performed by each container that operates on the host 3. In addition, for example, the load due to the communication via the virtual switch 37 can be replaced with the CPU load associated with the operation of the virtual switch 37.

Thus, the analysis device 2 acquires the second information indicating the CPU load associated with the operation of the virtual switch 37. Then, with the first information indicating the CPU load associated with the operation of each container in addition to the acquired second information, the analysis device 2 calculates the third information indicating the CPU load caused by the communication performed by each container, and displays the calculated third information.

This arrangement enables the analysis device 2 to display, for example, the CPU load measured from each container (first information) and the CPU load due to the communication performed by each container (third information) in association with each other. Thus, for example, the administrator browses the contents displayed by the analysis device 2, so that the administrator can accurately specify a container in a high load status (container that has a great influence on the host).

Note that in the above example, there has been described the case where the management device 1 and the analysis device 2 are different devices. However, one physical machine may function as each of the management device 1 and the analysis device 2.

Second Embodiment

Figure 22:
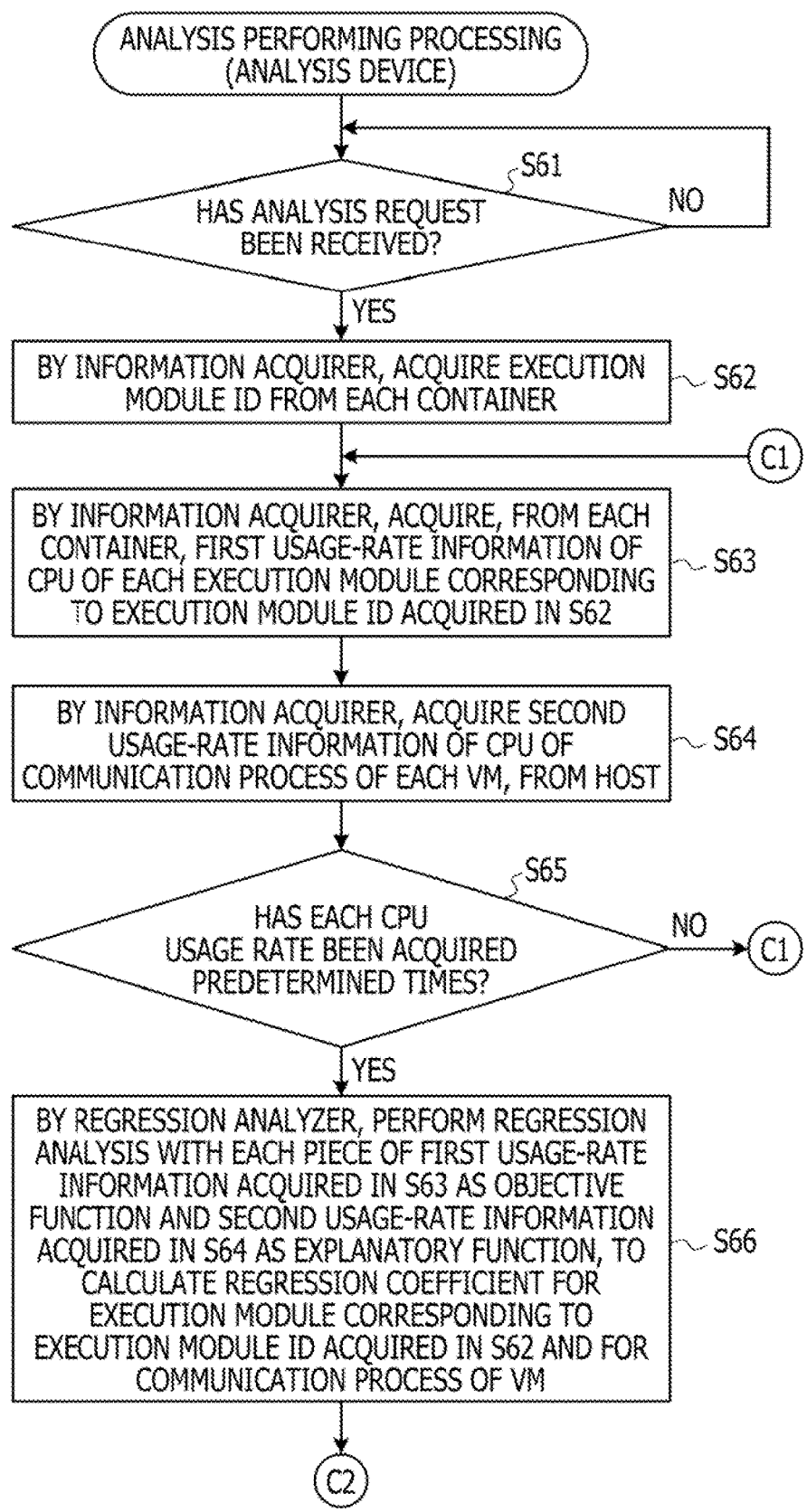
FIG. 22 is an explanatory flowchart illustrating the details of CPU-status display processing according to a second embodiment.
Figure 23:
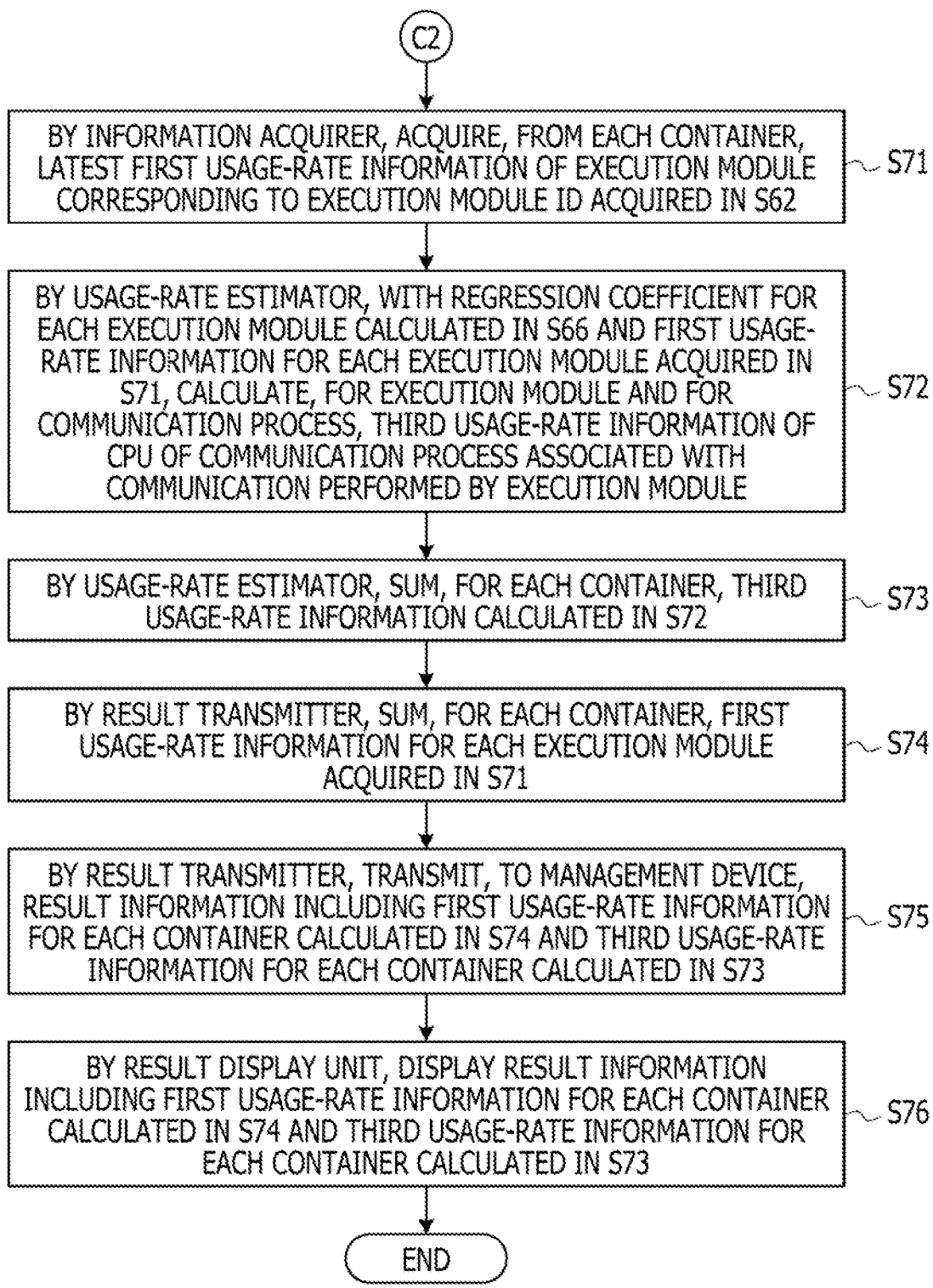
FIG. 23 is an explanatory flowchart illustrating the details of the CPU-status display processing according to the second embodiment.

Next, a second embodiment will be described. FIGS. 22 and 23 are explanatory flowcharts illustrating the details of CPU-status display processing according to the second embodiment. In addition, FIGS. 24 to 26 are explanatory tables illustrating the CPU-status display processing in the second embodiment.

In the second embodiment, processing is performed by referring to second usage-rate information 232 for the communication process corresponding to each virtual machine.

Note that processing performed in the management device 1 is the same as the CPU-status display processing in the first embodiment, and thus the description thereof will be omitted.

As illustrated in FIG. 22, the request receiver 211 of the analysis device 2 waits until the reception of an analysis request from the management device 1 (NO in S61).

Then, in a case where the request receiver 211 has received the analysis request from the management device 1 (YES in S61), the information acquirer 212 of the analysis device 2 acquires an execution module ID of each container, from the container (S62).

Furthermore, in this case, the information acquirer 212 acquires, from each container, first usage-rate information 231 indicating the CPU usage rate of the execution module corresponding to the execution module ID acquired in the processing of S62 (S63). Hereinafter, a specific example of the first usage-rate information 231 will be described.

[Specific Example of First Usage-Rate Information]

FIG. 24 is the explanatory table illustrating the specific example of the first usage-rate information 231. FIG. 24 is a specific example of the first usage-rate information 231 of the execution modules on the host 3.

The first usage-rate information 231 indicated in FIG. 24 has, as items, "time" to which each time is set and "module 33a" to which the first usage-rate information 231 corresponding to the module 33a in the container 33 is set. Furthermore, the first usage-rate information 231 indicated in FIG. 24 has, as items, "module 34a" to which the first usage-rate information 231 corresponding to the module 34a in the container 34 is set and "module 35a" to which first usage-rate information 231 corresponding to the module 35a in the container 35.

For example, in the first usage-rate information 231 indicated in FIG. 24, "10:00:00" as the "time", "66(%)" as the "module 33a", "59(%)" as the "module 34a", and "11(%)" as the "module 35a" are set to the information in the first row.

Furthermore, in the first usage-rate information 231 indicated in FIG. 24, "10:00:10" as the "time", "65(%)" as the "module 33a", "30(%)" as the "module 34a", and "17(%)" as the "module 35a" are set to the information in the second row. The description of other information included in FIG. 24 will be omitted.

Referring back to FIG. 22, the information acquirer 212 acquires, the second usage-rate information 232 indicating the CPU usage rate of the communication process for each virtual machine, from the host (S64).

It is determined whether each CPU usage rate has been acquired for a predetermined time (S65).

Hereinafter, a specific example of the second usage-rate information 232 will be described.

[Specific Example of Second Usage-Rate Information]

FIG. 25 is the explanatory table illustrating the specific example of the second usage-rate information 232. FIG. 25 is a specific example of the second usage-rate information 232 of the execution modules on the host 3. Note that in the following description, it is assumed that the second usage-rate information 232 is acquired from each of the communication process of the virtual machine 31 and the communication process of the virtual machine 32 that operate on the host 3.

The second usage-rate information 232 indicated in FIG. 25 has, as items, "time", "first communication process", and "second communication process". Each time is set to the "time". The second usage-rate information 232 corresponding to the communication process of the virtual machine 31 is set to the "first communication process". The second usage-rate information 232 corresponding to the communication process of the virtual machine 32 is set to the "second communication process".

For example, in the second usage-rate information 232 indicated in FIG. 25, "10:00:00" as the "time", "36(%)" as the "first communication process", and "50(%)" as the "second communication process" are set to the information in the first row.

Furthermore, in the second usage-rate information 232 indicated in FIG. 25, "10:00:10" as the "time", "26(%)" as the "first communication process", and "37(%)" as the "second communication process" are set to the information in the second row. The description of other information included in FIG. 25 will be omitted.

Referring back to FIG. 22, the regression analyzer 213 of the analysis device 2 performs a regression analysis with each piece of the first usage-rate information 231 acquired in the processing of S63 as an objective function and the second usage-rate information 232 acquired in the processing of S64 as an explanatory function, to calculate a regression coefficient for the execution module corresponding to the execution module ID acquired in the processing of S62 and for the communication process of the virtual machine (S66).

For example, unlike the first embodiment, the regression analyzer 213 in the second embodiment calculates a regression coefficient for each execution module and for each communication process. Hereinafter, a specific example of the processing of S66 will be described.

[Specific Example of Processing of S66]

The regression analyzer 213 calculates a regression coefficient for each execution module by following Expressions (9) to (11) below, for example.

[Mathematical Expression 9]

$$y_m = \beta_{1,m} x_1 + \ldots + \beta_{N,m} x_N + \epsilon \quad \text{(Expression 9)}$$

[Mathematical Expression 10]

$$\min_{\beta_m} J(\beta_m) = \|Y_m - X\beta_m\|_2^2 \quad \text{(Expression 10)}$$

[Mathematical Expression 11]

$$\hat{\beta}_m = (X^T X)^{-1} X^T Y_m \quad \text{(Expression 11)}$$

In the above Expressions (9) to (11), $y_m$ represents the second usage-rate information 232 corresponding to the communication process of the m-th virtual machine, and $x_i$ represents the first usage-rate information 231 corresponding to the i-th execution module, $\beta_{i,m}$ represents the regression confident corresponding to the i-th execution module and the communication process of the m-th virtual machine, and $\epsilon$ represents an error. Furthermore, in the above Expressions (9) to (11), $\beta_m$ represents a matrix containing, as elements, the regression coefficients corresponding to the communication process of the m-th virtual machine among the regression coefficients corresponding one-to-one to the execution modules, X represents a matrix containing, as elements, the pieces of the first usage-rate information 231 corresponding one-to-one to the execution modules, and Y represents a matrix containing, as elements, the second usage-rate information 232 corresponding to the communication process of the m-th virtual machine among the pieces of the second usage-rate information 232 corresponding one-to-one to the communication processes.

Then, each $\beta_{i,m}$ corresponding to the execution module is obtained by performing a multiple regression analysis such that $\epsilon$ in the above Expression (9) is minimized. For example, each $\beta_{i,m}$ corresponding to the execution module is given as $\beta_m$ that minimizes the above Expression (10), and is generally obtained by solving the above Expression (11).

Here, in the first usage-rate Information 231 described with reference to FIG. 24 and the second usage-rate information 232 described with reference to FIG. 25, "66(%)", "59(%)", "11(%)", "36(%)", and "50(%)" are set, respectively, to the "module 33a", the "module 34a", the "module 35a", the "first communication process", and the "second communication process" corresponding to the information including the time of "10:00:00". In addition, "65(%)", "30(%)", "17(%)", "26(%)", and "37(%)" are set, respectively, to the "module 33a", the "module 34a", the "module 35a", the "first communication process", and the "second communication process" corresponding to the information including the "time" of "10:00:10", and "50(%)", "83(%)", "40(%)", "58(%)", and "63(%)" are set, respectively, to the "module 33a", the "module 34a", the "module 35a", the "first communication process", and the "second communication process" corresponding to the information including the time of "10:00:20". Furthermore, "46(%)", "65(%)", "33(%)", "37(%)", and "54(%)" are set, respectively, to the "module 33a", the "module 34a", the "module 35a", the "first communication process", and the "second communication process" corresponding to the information including the "time" of "10:00:30".

Thus, the regression analyzer 213 assigns each value above to the above Expression (9) to generate the following Expression (12).

[Mathematical Expression 12]

$$36 = 66 \times \beta_{1,1} + 59 \times \beta_{2,1} + 11 \times \beta_{3,1} + \epsilon$$

$$26 = 65 \times \beta_{1,1} + 30 \times_{2,1} + 17 \times \beta_{3,1} + \epsilon$$

$$58 = 50 \times \beta_1 + 83 \times \beta_{2,1} + 40 \times \beta_{3,1} + \epsilon$$

$$37 = 46 \times \beta_{1,1} + 65 \times \beta_{2,1} + 33 \times \beta_{3,1} + \epsilon$$

$$50 = 66 \times \beta_{1,2} + 59 \times \beta_{2,2} + 11 \times \beta_{3,2} + \epsilon$$

$$37 = 65 \times \beta_{1,2} + 30 \times \beta_{2,2} + 17 \times \beta_{3,2} + \epsilon$$

$$63 = 50 \times \beta_{1,2} + 83 \times \beta_{2,2} + 40 \times \beta_{3,2} + \epsilon$$

$$54 = 46 \times \beta_{1,2} + 65 \times \beta_{2,2} + 33 \times \beta_{3,2} + \epsilon \quad \text{(Expression 12)}$$

Then, the regression analyzer 213 performs a multiple regression analysis such that $\epsilon$ in the above Expression (12) is minimized. Specifically, the regression analyzer 213 solves the following Expression (13) to obtain each of $\beta_{1,1}$ to $\beta_{3,2}$, for example.

$$Y_1 = \begin{pmatrix} 36 \\ 26 \\ 58 \\ 37 \end{pmatrix}, Y_2 = \begin{pmatrix} 50 \\ 37 \\ 63 \\ 54 \end{pmatrix}, X = \begin{pmatrix} 66 & 59 & 11 \\ 65 & 30 & 17 \\ 50 & 83 & 40 \\ 46 & 65 & 33 \end{pmatrix}, X^T = \begin{pmatrix} 66 & 65 & 50 & 46 \\ 59 & 30 & 83 & 40 \\ 11 & 46 & 17 & 33 \end{pmatrix}$$ (Expression 13)

$$\hat{\beta}_1 = \begin{pmatrix} \hat{\beta}_{1,1} \\ \hat{\beta}_{2,1} \\ \hat{\beta}_{3,1} \end{pmatrix} = (X^T X)^{-1} X^T Y_1 = \begin{pmatrix} 0.10 \\ 0.45 \\ 0.27 \end{pmatrix}, \hat{\beta}_2 = \begin{pmatrix} \hat{\beta}_{1,2} \\ \hat{\beta}_{2,2} \\ \hat{\beta}_{3,2} \end{pmatrix} = (X^T X)^{-1} X^T Y_2 = \begin{pmatrix} 0.29 \\ 0.48 \\ 0.25 \end{pmatrix}$$

Next, as illustrated in FIG. 23, the information acquirer 212 acquires, from each container, the latest first usage-rate information 231 of the execution module corresponding to the execution module ID acquired in the processing of S62 (S71).

Thereafter, with the regression coefficient for each execution module calculated in the processing of S66 and the first usage-rate Information 231 for each execution module acquired in the processing of S71, the usage-rate estimator 214 of the analysis device 2 calculates, for the execution module and for the communication process, third usage-rate information 233 indicating the CPU usage rate of the communication process associated with the communication performed by each execution module (S72).

Then, the usage-rate estimator 214 calculates, for each container, the total of the third usage-rate information 233 calculated in the processing of S72 (S73). Hereinafter, specific examples of the processing of S72 and S73 will be described.

[Specific Examples of Processing of S72 and S73]

The usage-rate estimator 214 calculates the third usage-rate information 233 for each container by following Expression (14) below, for example.

$$\hat{y}_{Container} = \sum_{m}^{M} \sum_{i \in Container}^{i} \hat{\beta}_{i,m} x_i$$ (Expression 14)

Specifically, for example, in a case where the regression coefficients corresponding one-to-one to the module 33a, the module 34a, and the module 35a (regression coefficients calculated in the processing of S66) are "0.1", "0.45", and "0.27" among the regression coefficients corresponding to the virtual machine 31, the regression coefficients corresponding one-to-one to the module 33a, the module 34a, and the module 35a (regression coefficients calculated in the processing of S66) are "0.29", "0.48", "0.25" among the regression coefficients corresponding to the virtual machine 32, and the pieces of the latest first usage-rate information 231 corresponding one-to-one to the module 33a, the module 34a, and the module 35a (first usage-rate information 231 acquired in the processing of S71) are "30(%)", "20(%)", and "10(%)", the regression analyzer 213, for example, as indicated in the following Expression (15), calculates "11.5(%)", "18.6(%)", and "5.2(%)" as the total of the third usage-rate information 233 of each of the container 33, the container 34, and the container 35.

[Mathematical Expression 15]

$$\hat{y}_{Container1} = \hat{\beta}_1 x_1 = 0.1 \times 30 + 0.29 \times 10 = 11.5$$

$$\hat{y}_{Container2} = \hat{\beta}_2 x_2 = 0.45 \times 20 + 0.48 \times 20 = 18.6$$

$$\hat{y}_{Container3} = \hat{\beta}_3 x_3 = 0.27 \times 10 + 0.25 \times 10 = 5.2$$ (Expression 15)

Referring back to FIG. 23, the result transmitter 215 of the analysis device 2 calculates, for each container, the total of the first usage-rate information 231 for each execution module acquired in the processing of S71 (S74). Specifically, the result transmitter 215 calculates the first usage-rate information 231 for each container by following Expression (16) below, for example.

$$x_{Container} = \sum_{i \in Container}^{i} x_i$$ (Expression 16)

Then, the result transmitter 215 transmits, to the management device 1, the result information 131 including the first usage-rate information 231 for each container calculated in the processing of S74 and the third usage-rate information 233 for each container calculated in the processing of S73 (S74).

Furthermore, the result display unit 216 of the analysis device 2 causes the display device (not illustrated) to display the result information 131 including the first usage-rate information 231 for each container calculated in the processing of S74 and the third usage-rate information 233 for each container calculated in the processing of S73 (S75). Hereinafter, a specific example of the result information 131 will be described.

[Specific Example of Result Information]

FIG. 26 is the explanatory table illustrating the specific example of the result information 131.

The result information 131 indicated in FIG. 26 has, as items, "VMID" for identifying each virtual machine, "container 33", "container 34", and "container 35". Information corresponding to the container 33 is set to the "container 33". Information corresponding to the container 34 is set to the "container 34". Information corresponding to the container 35 is set to the "container 35". Furthermore, each of the items "container 33", "container 34", and "container 35" has, as sub items, "container" and "communication". The first usage-rate information 231 for each container (total of the first usage-rate information 231 calculated in the processing of S74) is set to the "container". The third usage-rate information 233 for each container (total of the third usage-rate information 233 calculated in the processing of S73) is set to the "communication".

For example, in the result information 131 indicated in FIG. 26, "VM31" as the "VMID", "30(%)" as the "container" and "11.5(%)" as the "communication" corresponding to the "container 33", and "20(%)" as the "container" and "18.6(%)" as the "communication" corresponding to the "container 34" are set to the information in the first row.

Furthermore, in the result information 131 indicated in FIG. 26, "VM32" as the "VMID", and "10(%)" as the "container" and "5.2(%)" as the "communication" corresponding to the "container 35" are set to the information in the second row.

For example, the analysis device 2 in the second embodiment generates the result Information 131, with the second usage-rate information 232 for the communication process of each virtual machine.

As a result, for example, even if a processing load in reception of a communication packet or a processing load in transmission of a communication packet is different in communication process, the analysis device 2 can generate the result information 131 while reflecting the difference.

Third Embodiment

Figure 27:
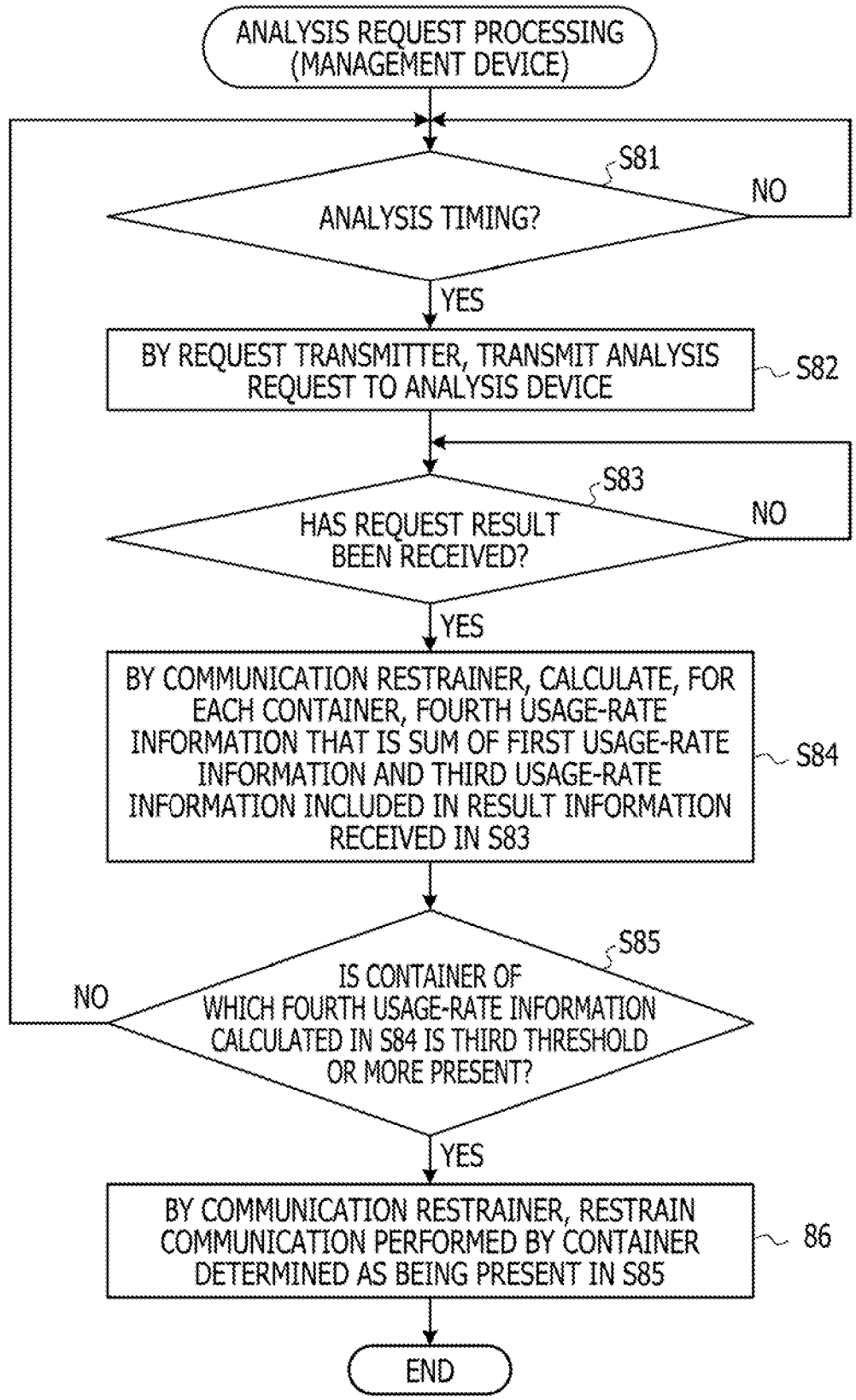
FIG. 27 is an explanatory flowchart illustrating CPU-status display processing according to a third embodiment.
Figure 28:
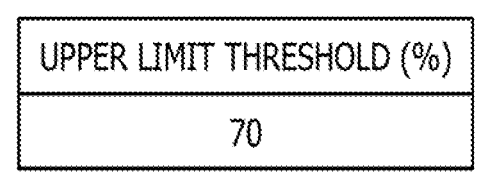

Next, a third embodiment will be described. FIG. 27 is an explanatory flowchart illustrating CPU-status display processing according to the third embodiment. In addition, FIG. 28 is an explanatory table illustrating a specific example of communication restraint information 134 according to the third embodiment.

In the third embodiment, in a case where a container having a large influence on a host is detected, the communication of the container is restricted.

Note that processing performed by the analysis device 2 is the same as the CPU-status display processing in the first embodiment, and thus the description thereof will be omitted.

As Illustrated in FIG. 27, the request transmitter 111 of the management device 1 waits until an analysis timing occurs (NO in S81).

Then, when the analysis timing occurs (YES in S81), the request transmitter 111 transmits an analysis request to the analysis device 2 (S82).

Thereafter, the result receiver 112 of the management device 1 waits until the reception of result information 131 transmitted from the analysis device 2 (NO in S83).

Then, in a case where the result information 131 transmitted from the analysis device 2 has been received (YES in S83), the communication restrainer 114 of the management device 1 calculates, for each container, total usage-rate information 132 (fourth usage-rate information 132) that is the sum of first usage-rate information 231 and third usage-rate information 233 included in the result information 131 received in the processing of S83 (S84).

Subsequently, the communication restrainer 114 determines whether or not a container of which the total usage-rate information 132 calculated in the processing of S84 is an upper limit threshold or more (hereinafter, also referred to as a third threshold) is present (S85).

For example, the communication restrainer 114 refers to the upper limit threshold included in communication restraint information 134 stored in the information storage area 130, and determines whether or not a container of which the total usage-rate information 132 calculated in the processing of S84 is the upper limit threshold or more is present. Hereinafter, the specific example of the communication restraint information 134 will be described.

[Specific Example of Communication Restraint Information]

FIG. 28 is the explanatory table illustrating the specific example of the communication restraint information 134.

The communication restraint information 134 indicated in FIG. 28 has, as an item, "upper limit threshold" that is a threshold referred in determination whether or not communication performed by each container is restrained.

For example, in the communication restraint information 134 indicated in FIG. 28, "70(%)" is set as the "upper limit threshold".

Note that a value larger than the value set to the "movement-destination threshold" in the threshold information 133 described with reference to FIG. 21 may be set to the "upper limit threshold" in the communication restraint information 134, for example. Specifically, a value that is 10(%) larger than the value set to the "movement-destination threshold" in the threshold information 133 described with reference to FIG. 21 may be set to the "upper limit threshold" in the communication restraint information 134, for example.

Referring back to FIG. 27, in a case where it is determined that the total usage-rate information 132 calculated in the processing of S84 is less than the upper limit threshold (NO in S85), the request transmitter 111 performs the processing from S81 again.

On the other hand, in a case where it is determined that the total usage-rate information 132 calculated in the processing of S84 is the upper limit threshold or more (YES in S85), the communication restrainer 114 restrains the communication performed by the container determined as being present in the processing of S85 (S86).

For example, in this case, the communication restrainer 114 restrains at least part of the communication performed by the container determined as being present in the processing of S85.

For example, in a case where it is determined that a container having a large load on the host is present, the management device 1 in the third embodiment restrains the communication performed by the container.

As a result, the management device 1 can restrain the occurrence of a container having a large load on the host without moving the container to another virtual machine.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A status display method performed by a computer, comprising:
    receiving first information indicating a first usage rate of a processor in a certain time period of the plurality of containers which operates on a virtual machine;
    receiving second information indicating a second usage rate of the processor in the certain time period of a first communication process of the virtual machine;
    identifying, for the plurality of containers, by acquiring values indicating effects of a usage status of the processor for the plurality of containers on a usage status of the processor of communication processes of the virtual machine by performing a regression analysis calculated by the first information and the second information and by multiplying the value and the first information, third information indicating a third usage rate of the processor in the certain time period of a second communication process of the virtual machine related to communication performed by each of the plurality of containers;

acquiring a total usage rate that is a sum of the first usage rate and the third usage rate for the plurality of containers;

determining whether the certain container of which the total usage rate is equal to or more than a first threshold is included in the plurality of containers; and moving, when the certain container is included in the plurality of containers, the certain container to another virtual machine that operates on another host different from the host.

2. The status display method according to claim 1, wherein the identifying includes identify the third information for the plurality of containers by performing a regression analysis calculated by the first information as an explanatory variable and the second information as an response variable.

3. The status display method according to claim 1, wherein the moving includes moving the specific container to the another host in a case where a sum of a usage rate of a processor of the another host and the total usage rate is smaller than a second threshold.

4. The status display method according to claim 1, wherein the status display method further comprising:

determining, based on the first information and the third information for the plurality of containers, whether or not a specific container satisfying a predetermined condition is included in the plurality of containers; and restraining communication by the specific container, in a case where the specific container is included in the plurality of containers.

5. A non-transitory computer-readable storage medium storing a program that causes a computer to execute a process, the process comprising:

receiving first information indicating a first usage rate of a processor in a certain time period of the plurality of containers which operates on a virtual machine;

receiving second information indicating a second usage rate of the processor in the certain time period of a first communication process of the virtual machine;

identifying, for the plurality of containers, by acquiring values indicating effects of a usage status of the processor for the plurality of containers on a usage status of the processor of communication processes of the virtual machine by performing a regression analysis calculated by the first information and the second information and by multiplying the value and the first information, third information indicating a third usage rate of the processor in the certain time period of a second communication process of the virtual machine related to communication performed by each of the plurality of containers;

acquiring a total usage rate that is a sum of the first usage rate and the third usage rate for the plurality of containers;

determining whether the certain container of which the total usage rate is equal to or more than a first threshold is included in the plurality of containers; and moving, when the certain container is included in the plurality of containers, the certain container to another virtual machine that operates on another host different from the host.

6. The non-transitory computer-readable storage medium according to claim 5, wherein the identifying includes identify the third information for the plurality of containers by performing a regression analysis calculated by the first information as an explanatory variable and the second information as an response variable.

7. The non-transitory computer-readable storage medium according to claim 5, wherein the moving includes moving the specific container to the another host in a case where a sum of a usage rate of a processor of the another host and the total usage rate is smaller than a second threshold.

8. The non-transitory computer-readable storage medium according to claim 5, wherein the process further comprising:

determining, based on the first information and the third information for the plurality of containers, whether or not a specific container satisfying a predetermined condition is included in the plurality of containers; and restraining communication by the specific container, in a case where the specific container is included in the plurality of containers.

\* \* \* \* \*